United States Patent
Kim et al.

(10) Patent No.: US 9,656,896 B2
(45) Date of Patent: May 23, 2017

(54) METHOD FOR STERILIZING WATER SUPPLY APPARATUS

(71) Applicant: LG ELECTRONICS INC., Seoul (KR)

(72) Inventors: Goeun Kim, Seoul (KR); Myounggon Kim, Seoul (KR); Youngjin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 14/875,739

(22) Filed: Oct. 6, 2015

(65) Prior Publication Data

US 2016/0229715 A1 Aug. 11, 2016

(30) Foreign Application Priority Data

Feb. 10, 2015 (KR) .................. 10-2015-0020394

(51) Int. Cl.
*C02F 1/467* (2006.01)
*C02F 9/00* (2006.01)
*C02F 1/00* (2006.01)

(52) U.S. Cl.
CPC .............. *C02F 9/005* (2013.01); *C02F 1/001* (2013.01); *C02F 1/4672* (2013.01); *C02F 2209/40* (2013.01); *C02F 2307/10* (2013.01)

(58) Field of Classification Search
CPC ........ C02F 9/005; C02F 1/001; C02F 1/4672; C02F 2307/10; C02F 2209/40
See application file for complete search history.

(56) References Cited

U.S. PATENT DOCUMENTS 6,270,650 B1 * 8/2001 Kazi .................. C02F 1/46104
204/242

FOREIGN PATENT DOCUMENTS

| KR | 10-1181328 | 9/2012 |
| KR | 10-2013-0006226 | 1/2013 |
| KR | 10-2013-0006234 | 1/2013 |

* cited by examiner

*Primary Examiner* — Arun S Phasge
(74) *Attorney, Agent, or Firm* — Fish & Richardson P.C.

(57) ABSTRACT

A method of sterilizing a water supply apparatus according to the present invention, in a method of sterilizing the water supply apparatus by a sterilizer, includes generating sterilizing water in a manner of electrolyzing purified water, sterilizing water tanks, passages and a water cock of the water supply apparatus by circulating the sterilizing water, draining out hot water, sterilizing a hot water tank, draining out the entire sterilizing water, rinsing the water tanks, the passages and the water cock, and draining out rinsing water.

19 Claims, 13 Drawing Sheets

METHOD FOR STERILIZING WATER SUPPLY APPARATUS

CROSS-REFERENCE TO RELATED APPLICATION

Pursuant to 35 U.S.C. §119(a), this application claims the benefit of earlier filing date and right of priority to Korean Application No. 10-2015-0020394, filed on Feb. 10, 2015, the contents of which is incorporated by reference herein in its entirety.

BACKGROUND OF THE INVENTION

1. Field of the Invention

This specification relates to a method of sterilizing a water supply apparatus of a water purifier using electrolysis, and more particularly, a method of sterilizing a water supply apparatus capable of performing a circulation sterilization and a rinsing function using raw water at the same time.

2. Background of the Invention

In general, a water purifier is an apparatus that filters piped water supplied from a source of the piped water in physical and chemical manners to remove impurities and supplies the filtered water.

The water purifiers may be classified into a natural filtration type, a direct filtration type, an ion-exchange type, a distillation type, a reverse osmosis type and the like.

Also, the water purifier may be classified into a storage type water purifier that stores purified water passed through a filter in a water tank and then supplies the stored purified water in a heating or cooling manner, and a direct flow water purifier that supplies purified water passed through a filter in a heating or cooling manner without a water tank.

What is important in a driving water supply apparatus such as a water purifier is sanitation because it supplies at least one of purified water, cooled water or hot water that a person directly drinks.

However, when the water purifier is used for a long term of time, foreign materials may be likely to be stuck in an inner passage of the water purifier through which water flows, a valve, a coke and the like. This may lower sanitation due to the propagation of germs such as microbes.

In order to remove contaminants of the water purifier, a sterilizer may be mounted in the water purifier or provided separate from the water purifier and connected to the water purifier if necessary, so as to sterilize the water purifier.

For example, the sterilizers may be classified into a direct sterilizer that generates sterilizing water containing a sterilization material through electrolysis of water, generates sterilizing water using raw water, makes the generated sterilizing water flow into a water tank and simultaneously sterilizes and drains out the water, and a circulation sterilizer that circulates sterilizing water between a sterilization module and a water purifier so as to sterilize water, as disclosed in the following prior art document.

However, the related art sterilizer has the following problems.

First, when no water is filled in an electrolyzer during an initial generation of sterilizing water using electrolysis, it may cause damages on electrodes and an electrolyte membrane of the electrolyzer.

Second, when hot water is supplied to the electrolyzer during generation of sterilizing water through electrolysis of water, steam pressure of water increases and gas solubility decreases, thereby interfering with smooth generation of the sterilizing water.

Third, in order to sterilize floating bacteria which can be sterilized in a relatively high concentration of sterilizing water, the high concentration of sterilizing water has to be generated. To generate the high concentration of sterilizing water, an input current applied to the electrolyzer or an operation time of the electrolyzer should increase. This causes a shortened lifespan of the electrolyzer and a problem of exhaust ozone that ozone as a sterilizing material is discharged out of water. Therefore, a way of generating the high concentration sterilizing water even without increasing the applied current and the operation time of the electrolyzer should be considered.

Fourth, for a direct type water purifier, when air bubbles are present in a circulation passage connecting the water purifier and the sterilizer, the air bubbles may badly affect the electrolyzer while passing through the electrolyzer. For example, when the air bubbles are brought into contact with a metallic coating layer formed on the electrodes and the electrolyte membrane, the air bubbles burst, which causes the metallic coating layer to be peeled off.

Fifth, during sterilization of the direct type water purifier with a hot water tank therein, an operation of circulating sterilizing water along the hot water tank, as well as a purified water passage and a cold water passage is required.

Sixth, after sterilization of a water purifier, water tanks and passages have to be washed out, but the related art circulation type sterilizer has a circulation passage but does not separately employ a rinsing water passage and a drain passage, resulting in limitation of performing a rinsing (or washing) operation.

SUMMARY OF THE INVENTION

Therefore, an aspect of the detailed description is to provide a method of sterilizing a water supply apparatus, capable of preventing damages on electrodes and electrolyte membranes of a sterilizing water generator by ensuring a predetermined amount of water prior to an operation of the sterilizing water generator.

Another aspect of the detailed description is to provide a method of sterilizing a water supply apparatus, capable of preventing hot water from flowing into a sterilizing water generator when generating sterilizing water through electrolysis of water.

Another aspect of the detailed description is to provide a method of sterilizing a water supply apparatus, capable of increasing a concentration of sterilizing water and extending a lifespan of a sterilizing water generator, even without increasing a current applied to electrodes of the sterilizing water generator or increasing an operation time of the sterilizing water generator.

Another aspect of the detailed description is to provide a method of sterilizing a water supply apparatus, capable of preventing damage on a sterilizing water generator due to air bubbles, by discharging out the air bubbles from a circulation passage connecting a directly type water purifier and a sterilizer.

Another aspect of the detailed description is to provide a method of sterilizing a water supply apparatus, capable of sterilizing a hot water tank, as well as a purified water passage and a cold water passage, in a circulating manner, during sterilization of a direct type water purifier having the hot water tank.

Another aspect of the detailed description is to provide a method of sterilizing a water supply apparatus, capable of facilitating a rinsing operation, without connecting a separate hose for washing out water tanks and passages after sterilization.

To achieve these and other advantages and in accordance with the purpose of this specification, as embodied and broadly described herein, there is provided a method of sterilizing a water supply apparatus, in a method of sterilizing by a sterilizer a water supply apparatus that is configured to purify raw water supplied from a raw water supply unit through filters and cool or heat the purified water so as to discharge the purified water, cold water or hot water through a water cock, the method including generating sterilizing water by supplying the purified water discharged from the water cock to a sterilizing water generator through a circulation passage and electrolyzing the purified water, sterilizing water tanks, passages and the water cock of the water supply apparatus by circulating the sterilizing water to the water supply apparatus along the circulation passage, draining out hot water from a hot water tank disposed in the water supply apparatus, sterilizing the hot water tank by supplying the sterilizing water to the hot water tank, draining out the entire sterilizing water from the water tanks and the passages, rinsing the water tanks, the passages and the water cock by supplying the raw water to the water supply apparatus through a rinsing water passage, the rinsing water passage extending from the raw water supply unit to the circulation passage, and draining out rinsing water from the water tanks, water tank connection passages and the water cock.

In one exemplary embodiment of the present invention, the method may further include initially circulating the purified water by supplying the purified water to the sterilizing water generator through the circulation passage prior to an operation of the sterilizing water generator.

In one exemplary embodiment of the present invention, the initially circulating may include detecting an amount of water introduced into the sterilizing water generator through a water flow sensor, the water flow sensor disposed at the sterilizing water generator, and turning on or off the sterilizing water generator according to the amount of water introduced, detected through the water flow sensor.

In one exemplary embodiment of the present invention, the water supply apparatus may be a storage type water purifier. The storage type water purifier may include a water storage tank to store the purified water, and a second water tank disposed below the water storage tank to store and heat the purified water discharged from the water storage tank. The sterilizing water may be introduced into the second water tank according to a difference of a water head of the water storage tank so as to discharge hot water from the second water tank.

In one exemplary embodiment of the present invention, in the steps of draining out the hot water and sterilizing the hot water tank, the sterilizing water of the water storage tank may be supplied to the hot water tank and simultaneously the hot water may be drained out of the hot water tank.

In one exemplary embodiment of the present invention, the sterilizing water generator may generate the sterilizing water using the purified water stored in the water storage tank.

In one exemplary embodiment of the present invention, the circulation passage may extend from the water cock to the sterilizing water generator via a circulation pump. The sterilizer may include a first drain passage having one side connected to the circulation passage to be located between the water cock and the circulation pump, and another side connected to an outside of the water supply apparatus. In the hot water draining step, the hot water may be discharged through the first drain passage before being introduced into the circulation pump and the sterilizing water generator.

In one exemplary embodiment of the present invention, the storage type water purifier may include a second water tank introduction passage having one side connected to the water storage tank, and another side connected to a lower surface of the second water tank. The sterilizer may include a second drain passage having one side connected to the second water tank introduction passage and another side connected to the outside of the water supply apparatus. The sterilizing water or rinsing water may be drained out of the water supply apparatus through the first and second drain passages.

In one exemplary embodiment of the present invention, the sterilizer may include a rinsing water supply passage having one side connected to the raw water supply unit, and another side connected to the circulation passage to be located between the water cock and the sterilizing water generator. The rinsing step may be executed by the raw water supplied to the water supply apparatus through the rinsing water supply passage and the circulation passage.

In accordance with another exemplary embodiment of the present invention, a method of sterilizing a water supply apparatus, in a method of sterilizing by a sterilizer a water supply apparatus that is configured to purify raw water supplied from a raw water supply unit through filters, store the purified water in a water storage tank, cool or heat the purified water discharged from the water storage tank, and discharge the purified water, cold water or hot water through a water cock, may include generating sterilizing water by electrolyzing the purified water discharged from the water storage tank through a sterilizing water generator, performing a primary sterilization by circulating the sterilizing water to the water supply apparatus, draining out some of the sterilizing water stored in the water storage tank, and performing a secondary sterilization by circulating the sterilizing water, left without being drained out, to the water supply apparatus.

In another exemplary embodiment of the present invention, the performing the primary sterilization may be started in a state that a water level of the water storage tank is a full water level.

In another exemplary embodiment of the present invention, the water supply apparatus may be a storage type water purifier. The storage type water purifier may include a first water tank to store and cool the purified water discharged from the water storage tank, and a second water tank disposed below the water storage tank to store and heat the purified water discharged from the water storage tank. The draining may include draining out hot water stored in the second water tank, and transferring some of the sterilizing water stored in the water storage tank to the second water tank.

In accordance with another exemplary embodiment of the present invention, a method of sterilizing a water supply apparatus, in a method of sterilizing by a sterilizer a water supply apparatus that is configured to purify raw water supplied from a raw water supply unit through filters, make the purified water flow through a purified water passage, cool the purified water through a cold water passage or heat the purified water discharged from the purified water passage, and discharge the purified water, cold water or hot water through a water cock, may include circulating the raw water to the water supply apparatus along a circulation passage prior to an operation of a sterilizing water generator, and initially draining the raw water discharged from the water supply apparatus, turning the sterilizing water generator on and supplying the purified water discharged from the water supply apparatus to generate sterilizing water through electrolysis, and circulating the sterilizing water to the water supply apparatus along the circulation passage to sterilize the water supply apparatus.

In another exemplary embodiment of the present invention, the water supply apparatus may be a direct type water purifier. The circulation passage may have one side connected to the water cock and another side extending to the sterilizing water generator via a circulation pump. The sterilizer may include a rinsing water supply passage having one side connected to the raw water supply unit, and another side connected to the circulation passage to be located between the circulation pump and the sterilizing water generator. In the initially draining step, the raw water may be supplied to an upstream side of the sterilizing water generator through the rinsing water supply passage.

In another exemplary embodiment of the present invention, the sterilizer may include a drain passage having one side connected to the circulation passage to be located between the water cock and the circulation pump, and another side connected to an outside of the water supply apparatus. The sterilizing water discharged from the water supply apparatus may be discharged out through the drain passage after the sterilizing step.

In another exemplary embodiment of the present invention, the direct type water purifier may include a hot water tank to heat and store the water purified through the filters. The method may further include, after the sterilizing step, sterilizing the hot water tank by circulating the sterilizing water to the hot water tank.

In another exemplary embodiment of the present invention, the method may further include draining out hot water stored in the hot water tank before sterilizing the hot water tank.

In another exemplary embodiment of the present invention, the generating the sterilizing water may be executed to generate the sterilizing water by supplying the raw water to the sterilizing water generator through the rinsing water supply passage.

According to the present invention with the configuration, the following effects can be obtained.

First, the electrodes of the sterilizing water generator can be prevented from being damaged, in a manner of initially circulating water to the sterilizing water generator before generating the sterilizing water through the electrolysis.

Second, cold water may be supplied to the sterilizing water generator upon the generation of the sterilizing water through the electrolysis of water and hot water may be discharged out before being introduced into the sterilizing water generator when sterilization and drainage of the hot water tank are performed, thereby allowing for smooth generation of the sterilizing water.

Third, the secondary circulation sterilization may be executed after reducing a predetermined amount of sterilizing water filled in the water storage tank in the sterilization and drainage step of the hot water tank after the primary circulation sterilization and before the secondary circulation sterilization. This may result in increasing a concentration of sterilizing water even without increasing an applied current and an operation time of the sterilizing water generator, thereby sterilizing adhered bacteria which can be sterilized in a high concentration of sterilizing water and also extending a lifespan of the sterilizing water generator.

Fourth, for a direct type water purifier, air bubbles may be removed from the circulation passage connecting the water purifier and the sterilizer, thereby solving a problem that the air bubbles badly affect the electrodes of the sterilizing water generator while passing through the sterilizing water generator.

Fifth, the sterilization of the hot water tank as well as the purified water passage and the cold water passage can be facilitated during the sterilization of the direct type water purifier.

Sixth, the sterilizer may be provided with the rinsing water supply passage, which may facilitate for washing out water tanks and passages after sterilization.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 4A to 4D are conceptual views illustrating each step of the sterilizing method of FIG. 3 in detail, in which FIG. 4A is a conceptual view illustrating an initial circulation step and a circulation sterilization step, FIG. 4B is a conceptual view illustrating a hot water tank sterilization and drainage step, FIG. 4C is a conceptual view illustrating a full drainage step, and FIG. 4D is a conceptual view illustrating a rinsing water supply step;

DETAILED DESCRIPTION OF THE INVENTION

Description will now be given in detail of a sterilization system and method according to the present invention, with reference to the accompanying drawings. For the sake of brief description with reference to the drawings, the same or equivalent components will be provided with the same reference numbers, and description thereof will not be repeated. A singular representation may include a plural representation unless it represents a definitely different meaning from the context.

For the sake of clear understanding of this specification, description of a sterilization system will first be given, and followed by description of a sterilization method.

Sterilization System

Figure 1:
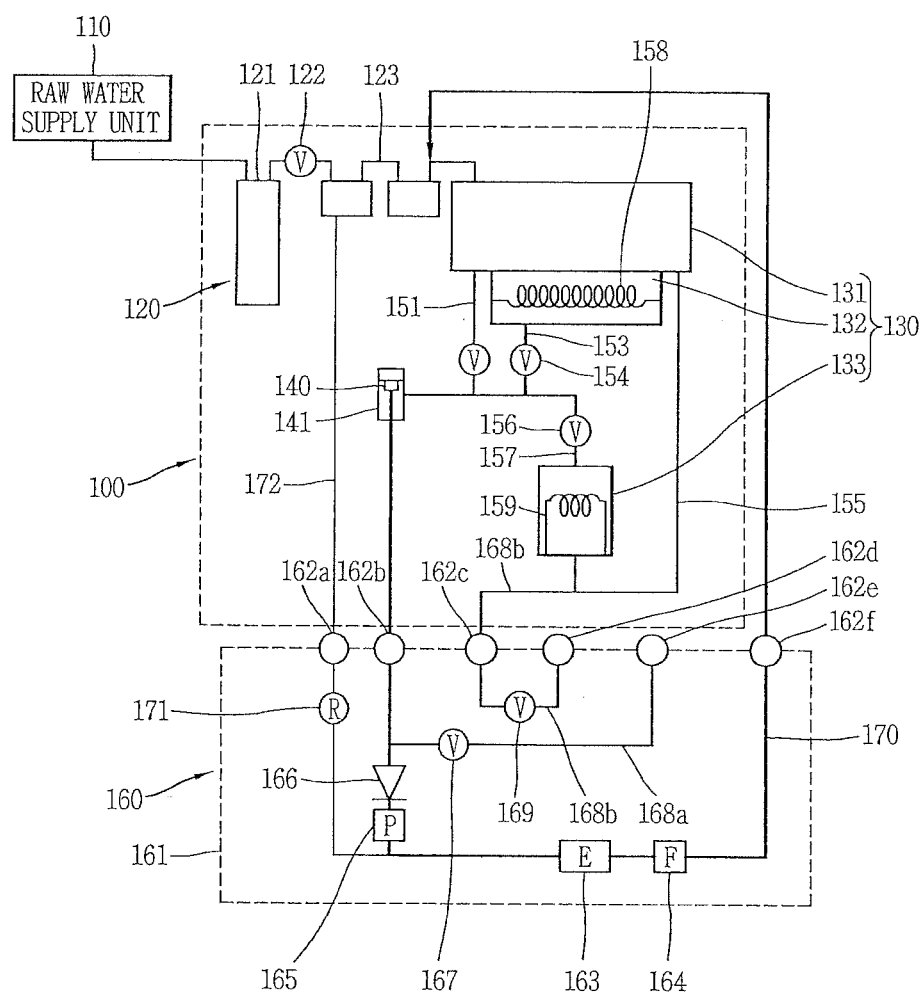
FIG. 1 is a conceptual view illustrating a sterilization system in accordance with one exemplary embodiment of the present invention.

FIG. 1 is a conceptual view illustrating a sterilization system in accordance with one exemplary embodiment of the present invention.

A sterilization system according to the present invention is a system for sterilizing a water supply apparatus.

The water supply apparatus according to the present invention refers to a device which supplies drinking water. The water supply apparatus may be an independent device or a part of another device.

For example, the water supply apparatus may be a water purifier. The water purifier is a device which flows raw water supplied from a raw water supply unit 110 through a separate filter assembly to filter off foreign materials from the raw water and thus supplies clean water (hereinafter, referred to as 'purified water'). In addition, the water supply apparatus may be referred to as a device or a water purifier which supplies purified water to the user in a cold or hot state, if necessary. The water purifier may be an independent device of other home appliances.

Meanwhile, the water supply apparatus may configure a part of a home electronics, such as a refrigerator. That is, purified water passed through a filter assembly in a refrigerator may be supplied to an outside through the water supply apparatus. Of course, water purified in the refrigerator may be cooled or frozen such that cold water or ice pieces can be supplied to the outside through the water supply apparatus (a so-called dispenser).

The sterilization system may include a sterilizer (or a sterilizing device).

The sterilizer may be modularized (or standardized) into a sterilization kit 160, so as to be provided separate from a water purifier or mounted in the water purifier for use. FIG. 1 illustrates a state the sterilization kit 160 is provided separate from the water purifier. A healthcare manager may use the separately-provided sterilization kit 160 to sterilize a water purifier and the like when a user requests for the sterilization or by visiting the user at a periodic inspection date according to a contract.

The sterilization kit 160 illustrated in FIG. 1 includes a housing 161 indicated with a dashed line, and several components disposed in the housing 161.

The housing 161 defines an outer appearance of the sterilization kit 160 and protects those internal components from an external impact. Also, a handle or the like is provided at an outer side of the housing 161 to facilitate for carrying the sterilization kit 160. The housing 161 may be divided into an upper cover and a lower cover which are detachably coupled to each other. This may result in convenient maintenance of the internal components.

A plurality of ports 162a to 162f may be provided on one side surface of the housing 161. A circulation passage 170, a rinsing water supply passage 172 and drain passages 168 and 168b, each of which is formed in a shape of a hose, a pipe or the like, may be inserted through or drawn out of those ports 162a to 162f to be connected to the internal components of the housing 161. Left three of those ports illustrated in FIG. 1 are inlet ports 162a to 162c and right three of them are outlet ports 162d to 162f.

The configuration of the internal components disposed in the housing 161 may include a sterilizing water generator 163, a circulation pump 165, passages and valves.

The sterilizing water generator 163 generates sterilizing water by processing purified water supplied through the circulation passage 170. The sterilizing water generator 163 according to the present invention may be an electrolyzer that can electrolyze the purified water.

The electrolyzer according to one exemplary embodiment may generate sterilizing water in a manner of electrolyzing water with chloride ions melted therein such that the chloride icons can be changed into hydrochloride ions as sterilization substances. The electrolyzer includes a casing, an anode and a cathode disposed in the casing to face each other. The electrolyzer may also include a water inlet through which water is guided to flow between the anode and the cathode in the casing, and a water outlet through which water flowed along between the anode and the cathode is discharged externally. The use of the electrolyzer that generates the sterilizing water by electrolyzing the water containing the melted chloride ions can result in reducing costs and enabling simply washing. Also, it may allow for a continuous supply of sterilizing water, thereby enabling fast sterilization of the water purifier. The internal structure of the electrolyzer has already been known, and thus detailed description will be omitted.

In an electrolyzer according to another exemplary embodiment, electrodes are disposed at both side surfaces of a solid polymer electrolyte to face each other. When a predetermined strength (quantity) of power is applied to both of the electrodes facing each other, an electrolysis reaction is induced within water to generate ozone of a high concentration within the water, which may result in generation of sterilizing water mixed with the ozone having strong sterilization force. For example, an electrode assembly which is provided in a frame to generate ozone may include an anode, a cathode, and a solid polymer electrolyte membrane disposed between the anode and the cathode to transfer hydrogen ions generated through the electrolysis.

Chemical reactions taking place between the anode and the cathode are explained as follows.

At the anode, an oxygen and hydrogen generation, as illustrated in Formula (1), and an ozone generation, as illustrated in Formulas (2) and (3), take place.

$$2H_2O \rightarrow O_2 + 4H^+ + 4e^- \qquad \text{Formula (1)}$$

$$H_2O + O_2 \rightarrow O_3 + 2H^+ 2e^- \qquad \text{Formula (2)}$$

$$3H_2O \rightarrow O_3 + 6H^+ + 6e^- \qquad \text{Formula (3)}$$

A hydrogen generation, as illustrated in Formulas (4) and (5), takes place at the cathode.

$$nH^+ + ne^- \rightarrow (n/2)H_2 (n=4\sim6) \qquad \text{Formula (4)}$$

$$2H_2O + 2e^- \rightarrow H_2 + 2OH^- \qquad \text{Formula (5)}$$

Upon continuously generating ozone by the electrolyzer in raw water with water quality similar to that of tap water, without a high-priced preprocessing, such as strongly acidic cation exchange resin or reverse osmosis filtration, scales are generated on a surface of the cathode, which may result in lowering electrolysis efficiency. To remove the scales generated on the surface of the cathode, an auxiliary electrode may further be provided between the cathode and the solid polymer electrolyte membrane.

To generate the ozone within the water using the electrode assembly, constant current regulated DC power may be used. For example, a positive (+) current may be applied to the anode and a negative (−) current may be applied to the cathode to induce the electrochemical reactions of Formulas (1) to (3) at the anode, thereby generating a high concentration of ozone in a dissolved state. A method of supplying currents to the anode and the cathode may employ one of a typical constant current method of supplying an initially set value of current to be suitable for a characteristic of a system, and a variable constant current method of constantly changing a current value by measuring electrolysis resistance that varies according to a characteristic of water quality of raw water, or a combination thereof.

The sterilizing water generator 163 may generate sterilizing water by receiving purified water supplied from the water supply apparatus.

The sterilizer includes the circulation passage 170 which is formed in a shape of a pipe or a hose and through which the purified water supplied from the water supply apparatus (the water purifier) flows into the sterilizing water generator 163 and sterilizing water generated in the sterilizing water generator 163 is supplied back into the water supply apparatus so as to sterilize the water purifier.

The sterilizer may include a rinsing water supply passage 172 that supplies raw water to the water supply apparatus for rinsing (or washing out) the water supply apparatus using the raw water.

The sterilizer may include the circulation pump 165 that supplies a driving force for circulating the sterilizing water.

The sterilizer may include drain passages 168a and 168b formed in a shape of a pipe or hose for draining the sterilizing water out of the water purifier after completely sterilizing the water purifier.

The sterilizer may include drain valves 167 and 169 for opening and closing the drain passages 168a and 168b.

The sterilizer may include as basic components the sterilizing water generator 163, the circulation passage 170, the rinsing water supply passage 172, the circulation pump 165, and the first and second drain passages 168a and 168b, all of which are provided for sterilizing the water supply apparatus. Hereinafter, a detailed configuration of the sterilization system will be described based on a water purifier as one example of the water supply apparatus.

The sterilization system according to the present invention may be applicable to both of storage type and direct type water purifiers which can be classified according to a shape of a water purifier.

The water purifier illustrated in FIG. 1 is a storage type water purifier 100.

Referring to FIG. 1, the storage type water purifier 100 may be indicated by a dashed line forming a large rectangle. The sterilization kit 160 may be indicated by a dashed line forming a small rectangle and be disposed below the storage type water purifier.

A raw water supply unit 110 may be disposed at a left upper end portion from the dashed line of the large rectangle. The raw water supply unit 110 may be connected to a tap so as to supply tap water. The storage type water purifier 100 may be provided with a filter unit 120 therein.

The filter unit 120 may include a filter assembly, and filter connection passages 123 which connect the filter assembly to the raw water supply unit 110 and a water tank and connect filters.

The filter assembly may include three single filters 121 which are connected in series by the filter connection passages 123, and configured to filter off (purify) raw water and supply the filtered (purified) water into a water tank 130.

A raw water supply valve 122 may be installed at at least one of the filter connection passages 123 to open or close the filter connection passage 123 or adjust a supply amount of raw water.

The three single filters 121 may include a free carbon filter, a UF filter and a post carbon filter, and other types of filters may additionally be used.

The water tank 130 of the storage type water purifier 100 may include a water storage tank 131 to store purified water therein, a first water tank 132 to store cold water and a second water tank 133 to store hot water.

The water storage tank 131 may be connected to a filter 121 that is located at a rear end of the filter assembly (i.e., located at the most downstream side based on a flowing direction of water), to store purified water which has been passed through the filter assembly. The filter connection passage 123 of the filter 121 located at the rear end of the filter assembly may be coupled to communicate with an upper end of the water storage tank 131 so as to fully fill the purified water up to the upper end of the water storage tank 131. Here, an upper end portion of the water storage tank 131 may be sealed and air bubbles may be filled in an upper end of the sealed space of the water storage tank 131.

The first water tank 132 may be disposed below the water storage tank 131 and store the purified water that is discharged from the water storage tank 131. The first water tank 132 may be brought into contact with or separated from a lower end portion of the water storage tank 131. When the first water tank 132 and the water storage tank 131 are separated from each other, the first water tank 132 and the water storage tank 131 may be connected through a separate connection passage.

The first water tank 132 illustrated in FIG. 1 may be integrally coupled to a lower portion of the water storage tank 131. In this instance, a barrier wall may be provided between a lower end portion of the water storage tank 131 and an upper end portion of the first water tank 132, such that the purified water of the water storage tank 131 and cold water of the first water tank 132 can be stored in independent spaces of each other. A water draw-out hole may be formed through the barrier wall such that the purified water can be supplied from the water storage tank 131 into the first water tank 132 therethrough.

The first water tank 132 may be provided with a cooling device 158 to cool the purified water stored therein. The cooling device 158 may be installed inside or outside the first water tank 132.

The cooling device 158 may be configured as an evaporator of a refrigerating cycle. The refrigerating cycle includes a compressor to compress a refrigerant, a condenser to condense the refrigerant compressed in the compressor, an expansion valve to expand the refrigerant condensed in the condenser, and an evaporator to evaporate the refrigerant expanded in the expansion valve. The evaporator may be located in the first water tank 132 or at an outer wall of the first water tank 132. The refrigerant may absorb heat from the purified water in the first water tank 132 during the flow through the evaporator, thereby cooling the purified water.

The second water tank 133 may be disposed at a position that is lower than a position of the water storage tank 131, and separated from the first water tank 132. The second water tank 133 may be disposed at a position that is lower than that of the first water tank 132.

The second water tank 133 may store purified water discharged from the water storage tank 131. The second water tank 133 and the water storage tank 131 may be connected by a second water tank introduction passage 155. Accordingly, the purified water flowed out of the water storage tank 131 may be supplied into the second water tank 133 through the second water tank introduction passage 155. One side of the second water tank introduction passage 155 may be connected to a right end portion at a lower end of the water storage tank 131 and another side thereof may be connected to an upper end portion or a lower end portion of the second water tank 133. The another side of the second water tank introduction passage 155 illustrated in FIG. 1 is connected to a lower end portion of the second water tank 133. Accordingly, the purified water of the water storage tank 131 may be supplied into the lower end portion of the second water tank 133 along the second water tank introduction passage 155.

The second water tank 133 may be provided with a heater 159 to heat the purified water stored therein. The heater 159 may be installed at an inside or outside of the second water tank 133, but preferably installed in the second water tank 133 to prevent heat transfer to the outside of the second water tank 133. The second water tank 133 may be provided with a temperature sensor such that hot water can be maintained at a predetermined temperature.

The storage type water purifier 100 may include a water cock 140 through which water stored in the water purifier can be externally dispensed. The water cock 140 may be installed to be exposed to the outside of the water purifier such that the user can drink water. Purified water (water at room temperature), cold water or hot water can be dispensed through the water cock 140 from at least one water tank 130 of the water storage tank 131, the first water tank 132 and the second water tank 133. Along with the water cock 140, a lever 141 or a select button may be provided at the outside of the water purifier. The user may thus operate the lever 141 or press the select button to drink water. The water cock 140 may be provided by one or in plurality according to a design configuration of the water purifier. One water cock 140 illustrated in FIG. 1 is installed at the outside of the water purifier.

The storage type water purifier 100 includes water tank connection passages to connect the water cock 140 and the water tank 130 to each other.

The water tank connection passages may include a water storage tank connection passage 151, a first water tank connection passage 153 and a second water tank connection passage 157. The water storage tank connection passage 151 may have one side connected to a left end portion at a lower surface of the water storage tank 131 and another side connected to the second water tank connection passage 157. The first water tank connection passage 153 may have one side connected to one side of a lower surface of the first water tank 132 and another side connected to the second water tank connection passage 157. The second water tank connection passage 157 may have one side connected to an upper end portion of the second water tank 133 and another side connected to the water cock 140. Here, the purified water in the water storage tank 131 flows down along the water storage tank connection passage 151 and is carried to the water cock 140 through the second water tank connection passage 157. Also, the cold water of the first water tank 132 flows down along the first water tank connection passage 153 and is carried to the water cock 140 through the second water tank connection passage 157. The configuration of the water tank connection passages is exemplarily illustrated based on the case of employing the one water cock 140. Therefore, such design configuration of the water tank connection passages may be varied by a designer according to a number of the water cock 140.

The water tank connection passages are provided with valves for opening and closing the passages and adjusting a water flow.

For example, a purified water valve 152 may be installed at the water storage tank connection passage 151, a cold water valve 154 may be installed at the first water tank connection passage 153, and a hot water valve 156 may be installed at the second water tank connection passage 157.

The sterilization kit 160 includes a housing 161, a sterilizing water generator 163, a water flow sensor 164, a circulation pump 165, valves and pipes (circulation passage 170 and rinsing water supply passage), and the like, which are all installed in the housing 161.

The sterilization kit 160 may be a device which is independent of the water purifier or a component constructing a part of the water purifier.

The sterilization kit 160 may be configured such that the sterilizing water generator 163, the circulation pump 165, the circulation passage 170, the first and second drain passages 168a and 168b, the first and second drain valves 167 and 169, the rinsing water supply passage 172, a check valve 166 and the like are accommodated in the housing 161. The sterilization kit 160 may also be standardized (or modularized) such that each component can be detachably assembled in the housing 161.

A plurality of ports, for example, six ports may be straightly disposed on an upper surface of the housing 161 in a spaced manner. Left three of those six ports are inlet ports in which pipes or hoses are inserted, and right three of those six ports are outlet ports through which pipes or hoses are drawn out.

Each port will be described, from left to right ports in arrangement. The inlet ports may include a first port 162a providing an insertion hole through which the rinsing water supply passage 172 (pipe or hose) is connected to the circulation passage 170, a second port 162b providing an insertion hole through which the circulation passage 170 (pipe or hose) is connected to the circulation pump 165 and the sterilizing water generator 163, and a third port 162c providing an insertion hole through which the second drain passage 168b (pipe or hose) is connected into the housing 161. Also, the outlet ports may include a fourth port 162d providing a draw-out hole through which the second drain passage 168b (pipe or hose) is drawn out of the housing 161, a fifth port 162e providing a draw-out hole through which the first drain passage 168a (pipe or hose) is drawn out of the housing 161, and a sixth port 162f providing a draw-out hole through which the circulation passage 170 (pipe or hose) is connected to the water supply apparatus.

The sterilizing water generator 163 generates sterilizing water through electrolysis of water, which has been described above. Therefore, detailed description thereof is omitted.

The circulation pump 165 is a device for circulating fluid such as water or the like, specifically, the sterilizing water by applying pressure to the fluid. The circulation pump 165 may be implemented by any type of pump, such as a gear pump, if it is a pump capable of transferring fluid. Detailed description of the configuration of the circulation pump 165 is omitted.

The circulation passage 170 is a passage along which the sterilizing water circulates. The circulation passage 170 may be implemented in a shape of a pipe or a hose, and a pipe made of a hard material or a hose made of a flexible material may selectively be employed according to the configuration of the water purifier.

The circulation passage 170 may form a closed loop for the circulation of the sterilizing water and the like in a manner that one side thereof is connected to the water tank connection passage and another side connected to the water tank 130. One side of the circulation passage 170 may be connected to the second water tank connection passage 157 of the water tank connection passages, in detail, the water cock 140 connected to the second water tank connection passage 157. Also, another side of the circulation passage 170 may be connected to the water supply apparatus via the circulation pump 165 and the sterilizing water generator 163 disposed in the housing 161. In detail, the another side of the circulation passage 170 may be connected to an upper end portion of the water storage tank 131 or to a filter connection passage 123 between the filter 121 located at the rear end of the filter assembly and the water storage tank 131. The another side of the circulation passage 170 illustrated in FIG. 1 may be connected to the filter connection passage 123. In more detail, the circulation passage 170 may be inserted from the water cock 140 of the water purifier into the sterilization kit 160 through the second port 162b, which is formed at one side surface of the sterilization kit 160, and U-tern in the sterilization kit 160 to extend up to the upper end portion of the water storage tank 131 through the sixth port 162f formed at one side surface of the sterilization kit 160.

The sterilizing water generator 163 and the circulation pump 165 may be installed in the sterilization kit 160 and spaced in series apart from each other in the circulation passage 170. For example, the sterilizing water generator 163 may be installed in the circulation passage 170 which is formed in a shape of an alphabet "U" within the sterilization kit 160, and the circulation pump 165 may be located between the second port 162b and the sterilizing water generator 163.

With the passage structure, purified water stored in the water tank 130, namely, the water storage tank 131 or the first water tank 132 is transferred along the circulation passage 170 by a driving force transferred from the circulation pump 165 to be supplied into the sterilizing water generator 163. Sterilizing water generated in the sterilizing water generator 163 may be supplied sequentially to the water storage tank 131, the first water tank 132 and the second water tank 133.

For example, the sterilizing water stored in the water storage tank 131 may be supplied to the water cock 140 via the water storage tank connection passage 151 and the second water tank connection passage 157, supplied to the water cock 140 via the first water tank 132 and the first and second water tank connection passages 153 and 157, or supplied to the second water tank 133 via the second water tank introduction passage 155.

Accordingly, the sterilizing water generated in the sterilizing water generator 163 may sterilize the water storage tank 131, the first water tank 132, the second water tank 133, the water tank connection passages 151, 153 and 157, the second water tank introduction passage 155 and the water cock 140 in a circulating manner.

The first drain passage 168a is a passage for draining out the sterilizing water, which has been used to sterilize the water purifier, into the water storage tank 131, the first water tank 132 and the second water tank 133.

To this end, the first drain passage 168a may be branched out from one side of the circulation passage 170 in the sterilization kit 160. For example, one side of the first drain passage 168a may be connected to one side of the circulation passage 170, for example, to be located between the second port 162b and the circulation pump 165 of the sterilization kit 160, and another side of the first drain passage 168a may be connected to an outside of the sterilization kit 160, such that the sterilizing water can be discharged out of the water purifier and the sterilization kit 160.

With the configuration that the circulation passage 170 extends from the second port 162b to the circulation pump 165 and the first drain passage 168b is connected to the circulation passage 170 to be located between the second port 162b and the circulation pump 165, hot water discharged out of the water cock 140 may be discharged externally before being introduced into the circulation pump 165 and the sterilizing water generator 163. This may result in solving a problem of an introduction of the hot water in the circulation pump 165 and the sterilizing water generator 163, namely, a problem that the pump is damaged due to the hot water when internal components of the pump is vulnerable to hot water, or a problem of causing difficulty in generating the sterilizing water due to the hot water with high steam pressure and low gas solubility. Also, the configuration may allow air bubbles introduced into the circulation passage 170 in a direct type water purifier to be discharged externally before being introduced into the circulation pump 165 and the sterilizing water generator 163. This may result in solving a problem due to the introduction of the air bubbles into the circulation pump 165 and the sterilizing water generator 163, for example, a problem of damaging the circulation pump 165 and electrodes of the sterilizing water generator 163 due to the air bubbles. Also, the circulation passage 170 may extend from the water cock 140 to the circulation pump 165 and the first drain passage 168a is connected to the circulation passage 170 such that an upstream side of the first drain passage 168a is located between the water cock 140 and the circulation pump 165. This may provide an advantage in that the sterilizing water can flow through the water cock 140, which is vulnerable to sanitation, at least two times during the circulation sterilization and the drainage of the hot sterilizing water, resulting in improvement of the sanitation.

The second drain passage 168b may be provided, separate from the first drain passage 168a, such that the hot water can be discharged externally directly from the second water tank 133, which may result in a reduction of a drainage time of the sterilizing water.

To this end, one end of the second drain passage 168b may be connected to the second water tank introduction passage 155 of the water purifier and another side thereof may extend to the outside of the water purifier or extend to the outside of the water purifier through the sterilization kit 160. The second drain passage 168b illustrated in FIG. 1 may be configured such that the another side thereof is connected to the outside of the water purifier via the inside of the sterilization kit 160. This may allow the sterilizing water to be discharged out of the water purifier and the sterilization kit 160.

The rinsing water supply passage 172 is a passage for rinsing (or washing out) the sterilized water purifier using raw water.

To this end, the rinsing water supply passage 172 may have one side connected to the raw water supply unit 110 and another side connected to one side of the circulation passage 170. For example, the rinsing water supply passage 172 may extend from the second UF filter 121 of the filters 121 of the filter assembly and be connected to the circulation passage 170 via the first port 162a of the sterilization kit 160, so as to be located between the circulation pump 165 and the sterilizing water generator 163.

Accordingly, the raw water is introduced into the circulation passage 170 along the rinsing water supply passage 172 by water pressure thereof supplied from a source of tap water and flows through the sterilizing water generator 163 along the circulation passage 170. The raw water is then supplied to the water storage tank 131, the first water tank 132, the second water tank 133 and the water cock 140, and then drained out. Therefore, the raw water can rinse (wash out) the sterilizing water generator 163, and the sterilized water tank 130, water tank connection passages 151, 153 and 157 and water cock 140. Also, the rinsing water supply passage 172 is connected to the filter unit 120 of the water purifier upon setting the sterilizer for sterilizing the water purifier. This may solve the inconvenience of the healthcare manager who has to separate a connection hose of the water cock and drain out water into a sink when using the existing drain passage to wash out the water purifier after sterilization.

Also, the another side of the rinsing water supply passage 172 may be connected to the circulation passage 170 to be located between a branched point of the first drain passage 168a and the circulation pump 165. In this instance, the circulation pump 165 may further be washed out.

A regulator 171 may be installed at the rinsing water supply passage 172 to adjust an amount of raw water flowing along the rinsing water supply passage 172.

The check valve 166 is driven by pressure of fluid and restricts a flowing direction of the fluid to one direction. In the present invention, the check valve 166 may be installed at one side of the circulation passage 170. In detail, the circulation passage 170 may extend from the second port 162b to the circulation pump 165, and the check valve 166 may be installed at the circulation passage 170 to be located between the second port 162b and the circulation pump 165. The check valve 166 may allow purified water or sterilizing water to be transferred from the water cock 140 to the circulation pump 165 but prevent such water from flowing in a reverse direction, for example, from a downstream side of the circulation pump 165 to the water cock 140. Accordingly, upon supplying raw water through the rinsing water supply passage 172, the raw water can be prevented from flowing from the circulation passage 170 back to the water cock 140.

If the check valve 166 is not provided, the raw water may flow through the circulation pump 165 at a downstream side of the circulation pump 165, at which the raw water is to be introduced into the circulation passage 170 through the rinsing water supply passage 172, and then flows back to the water cock 140. In addition, pressure of the raw water which has flowed backward through the water cock 140 may cause the cold water valve 154 and the hot water valve 156 to be open. Accordingly, the raw water may be likely to flow back to the first water tank 132 and the second water tank 133. This is because the purified water valve, the cold water valve and the hot water valve used in the water purifier are all a solenoid valve, which merely opens and closes a passage to control a flow of fluid in a forward direction (for example, a direction that the purified water flows from the water storage tank into the first and second water tanks is the forward direction), and opens the passage when the pressure of the fluid is applied in a reverse direction (for example, a direction that the raw water flows from the water cock 140 into the first and second water tanks is the reverse direction). Therefore, when the rinsing water flows back to the first and second water tanks along the circulation passage 170, it causes sterilization dregs stuck on the circulation passage 170 to be introduced into the water cock 140 and the water tanks of the water purifier. To prevent this, preferably, the check valve 166 is installed at an upstream side of the circulation pump 165 and the another side of the rinsing water supply passage 172 is connected to the downstream side of the circulation pump 165.

The sterilization system according to the present invention may further include a power supply unit and a control unit.

The purified water valve 152, the cold water valve 154, the hot water valve 156 and the drain valves 168 and 168b may all be a solenoid valve, which may be opened or closed in response to a control signal received from the control unit.

The power supply unit is a device of supplying power to those valves and the sterilizing water generator 163. In order for the sterilizing water generator 163 to electrolyze purified water, a DC voltage has to be applied to the sterilizing water generator 163. To apply the DC voltage to the sterilizing water generator 163, the control unit may include a converter to convert AC power into DC power, and the like.

Also, the control unit is a device of controlling the circulation pump 165, the valves and the sterilizing water generator 163. Specifically, the control unit may include a current adjustor to control a current (magnitude, etc.) applied to the electrodes of the sterilizing water generator 163. A current adjusting method is a well-known technology, and detailed description thereof will be omitted.

The power supply unit and the control unit may be disposed in the sterilization kit 160.

Figure 2:
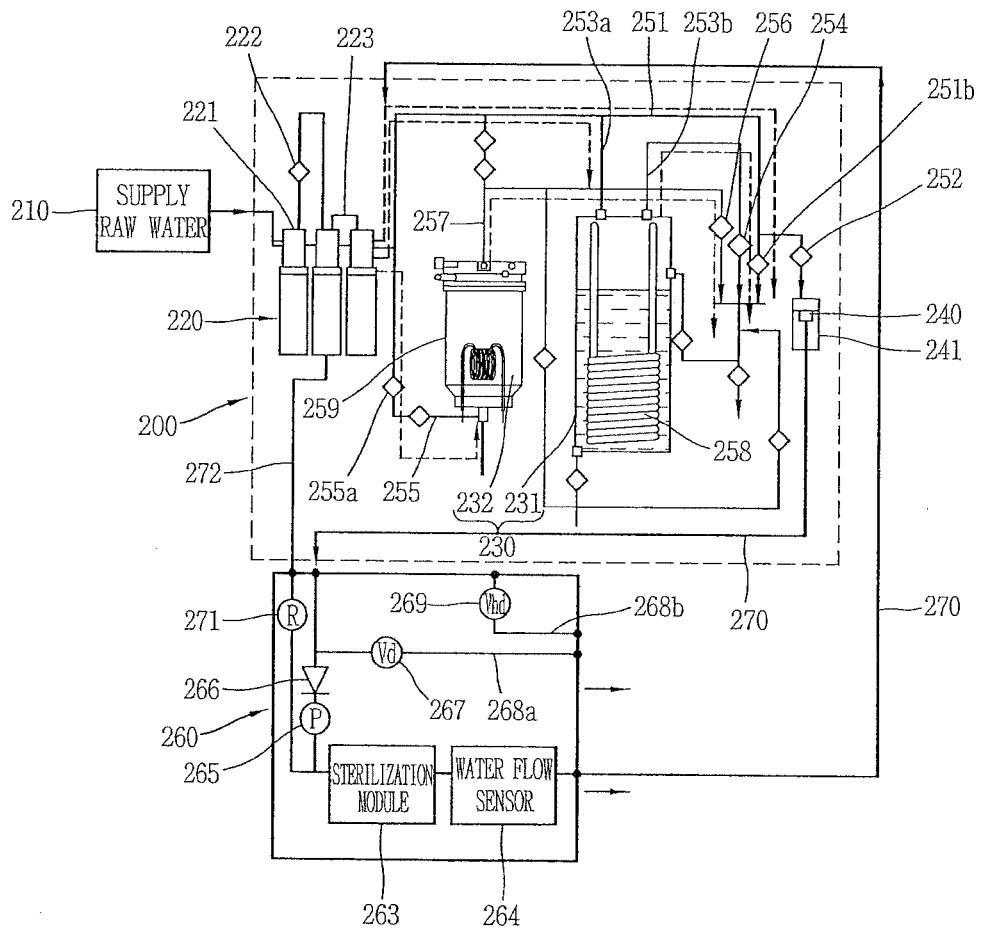
FIG. 2 is a conceptual view illustrating a state that a sterilization kit is applied to a direct type water purifier in accordance with the present invention.

FIG. 2 is a conceptual view illustrating a state that a sterilization kit is applied to a direct type water purifier in accordance with the present invention.

A sterilization kit 260 illustrated in FIG. 2 is configured similar to or the same as the embodiment illustrated in FIG. 1, and thus redundant description will be omitted for the sake of obvious explanation.

A direct type water purifier 200 illustrated in FIG. 2 does not include a water storage tank, and includes a first water tank 231 to cool water purified (or filtered) by a filter unit 220, a second water tank 232 to heat the purified water filtered by the filter unit 220, a water cock 240, and water tank connection passages. The first water tank 231 illustrated in FIG. 2 does not store the purified water filtered by the filter unit 220 but stores a cooling fluid (e.g., cooling water, etc.) to cool the purified water. Therefore, the purified water does not stay (is not filled) in the first water tank 231 but flows along a cold water passage 253 accommodated in the first water tank 231 so as to be cooled. The cooled purified water then flows through the first water tank 231 to be transferred to the water cock 240.

The direct type water purifier illustrated in FIG. 2 includes a purified water passage 251 to transfer the purified water filtered by the filter unit 220 to the water cock 240, a cold water passage 253 branched out from the purified water passage 251 and extending toward the water cock 240 through the first water tank 231, a second water tank introduction passage 255 having one side branched out from the purified water passage 251 and another side connected to a water inlet of the second water tank 232 to supply the purified water into the second water tank 232, and a second water tank outlet passage 257 having one side connected to a water outlet of the second water tank 232 and another side connected to the water cock 240 to transfer hot water heated in the second water tank 232 to the water cock 240.

The cold water passage 253 includes a cooling portion 258 formed in a shape of a coil to be sunk in the cooling fluid filled in the first water tank 231. The cooling portion 258 is in a shape of a pipe thin in diameter, and induces heat exchange between the purified water flowing in the pipe and the cooling fluid filled in the first water tank 231 so as to cool the purified water. One side of the cold water passage 253 is branched out from the purified water passage 251 and extends to a water inlet of the coil type cooling portion 258, such that the purified water is transferred to the coil type cooling portion 258. Also, another side of the cold water passage 253 extends from a water outlet of the coil type cooling portion 258 to the water cock 240, such that the purified water cooled in the cooling portion 258 is transferred to the water cock 240. The second water tank 232 of the direct type water purifier according to the present invention has a similar shape to a hot water tank of a storage type water purifier and includes a heater 259 therein. The second water tank 232 stores the purified water filtered by the filter unit 220 and heats the purified water by use of the heater 259. According to the design specification of the present invention, a direct type water purifier having a hot water storage tank may be included in a category of the direct type water purifier. A circulation passage 170 is connected to one of the purified water passage 251, the cold water passage 253, the second water tank connection passage (including the second water tank introduction passage 255 and the second water tank draw-out passage 257), to form a closed loop for a circulation or flow of the sterilizing water.

Other components are the same/like as those of the storage type water purifier, and thus redundant description thereof will be omitted for the sake of obvious explanation.

Hereinafter, description will be given of a sterilizing method using the sterilization system with the configuration.

Sterilizing Method

A sterilizing method according to the present invention may be applied to a tank type or storage type water purifier 100.

Figure 3:
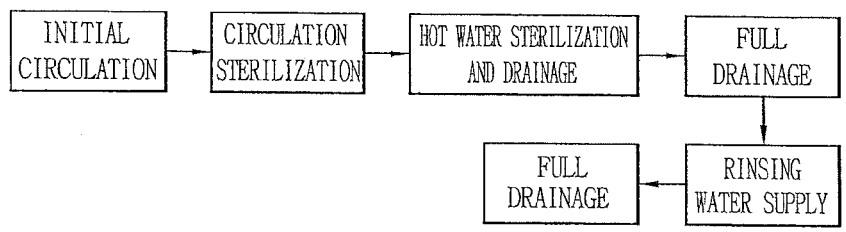
FIG. 3 is a block diagram illustrating a method of sterilizing a storage type water purifier in accordance with one exemplary embodiment of the present invention.
Figure 4A:
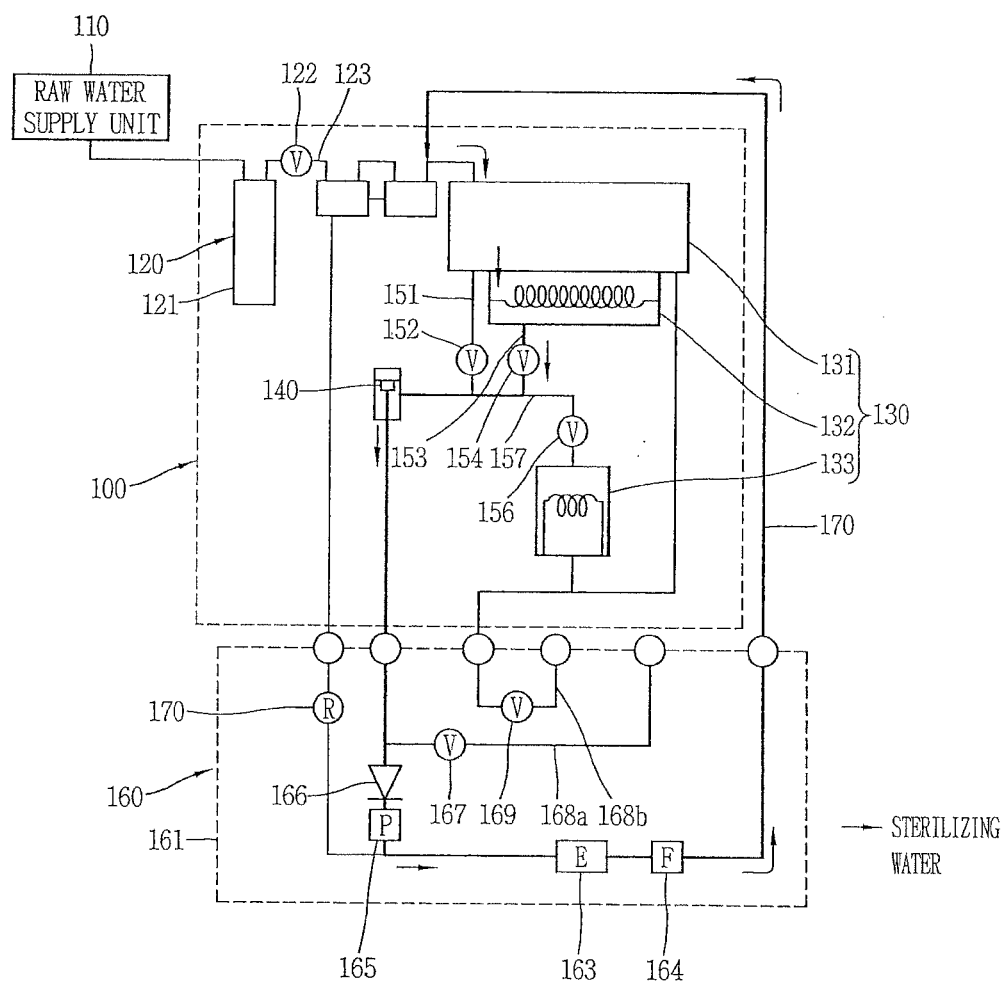
Figure 4B:
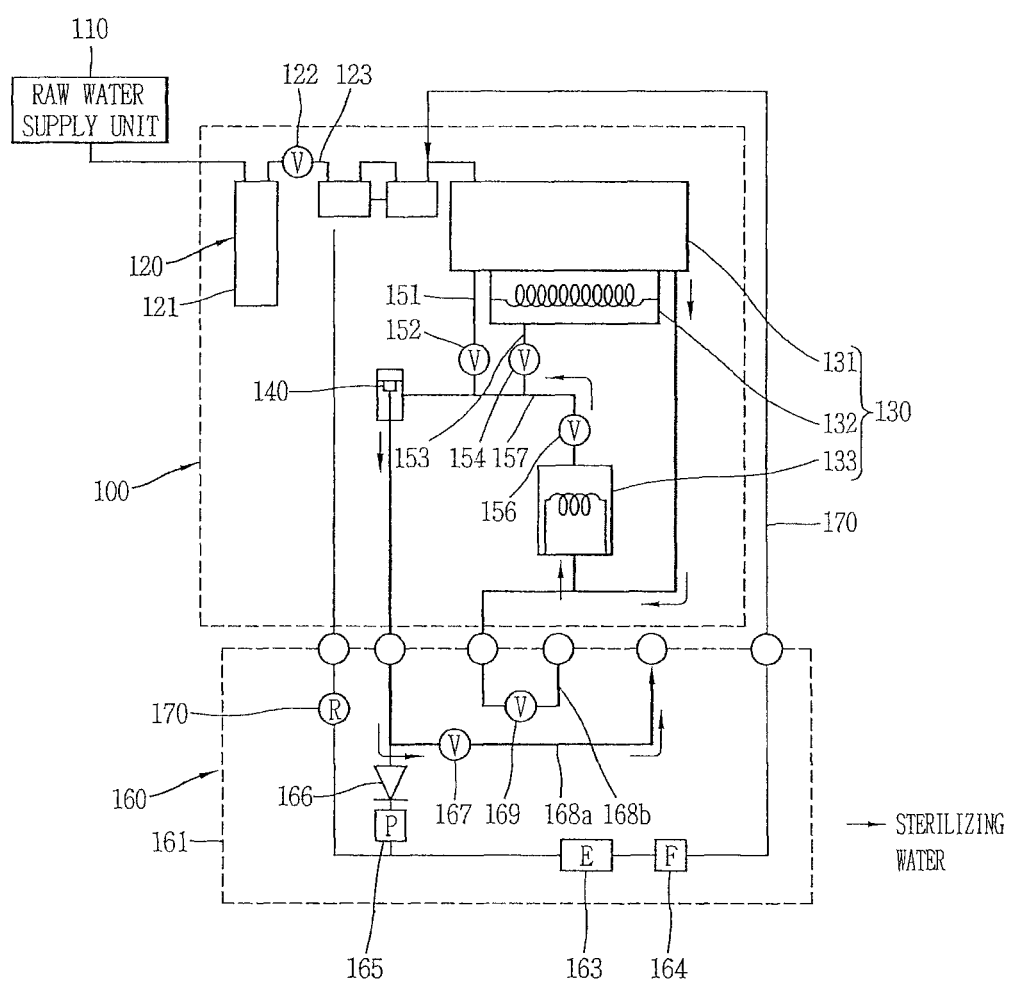
Figure 4C:
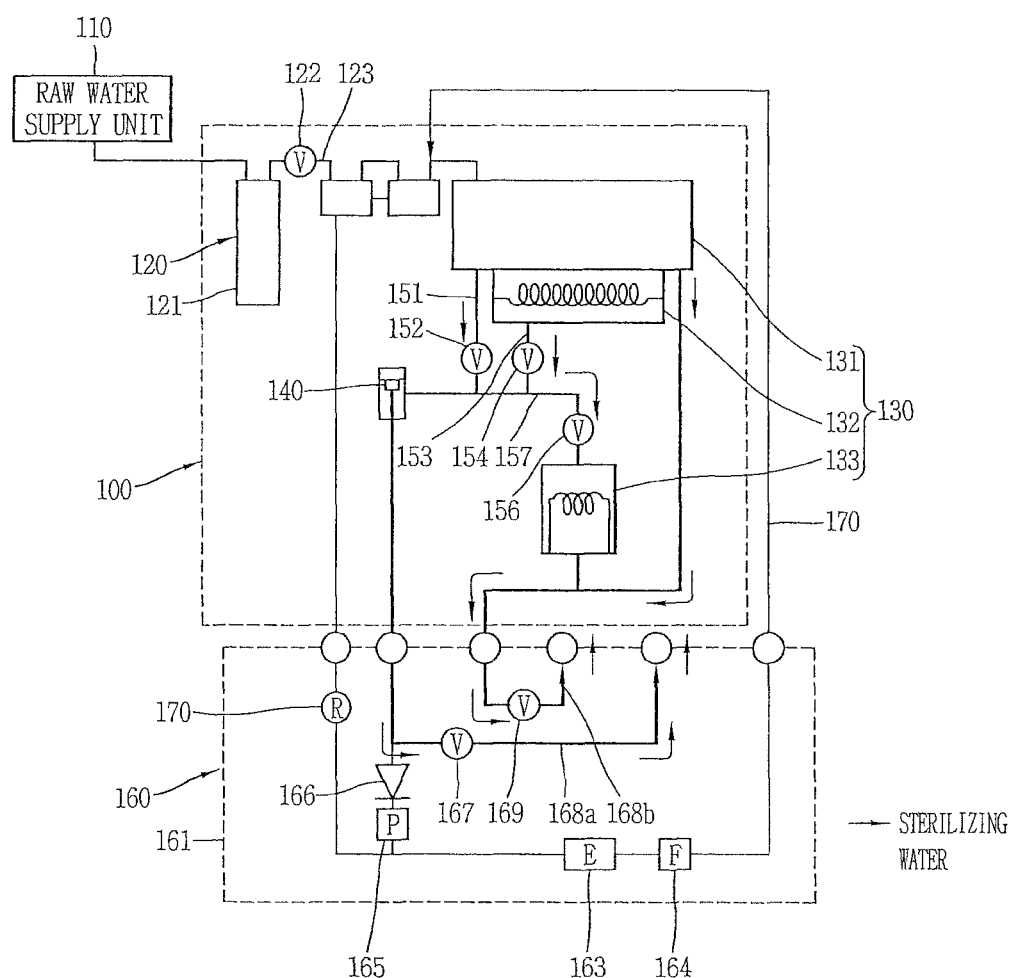
Figure 4D:
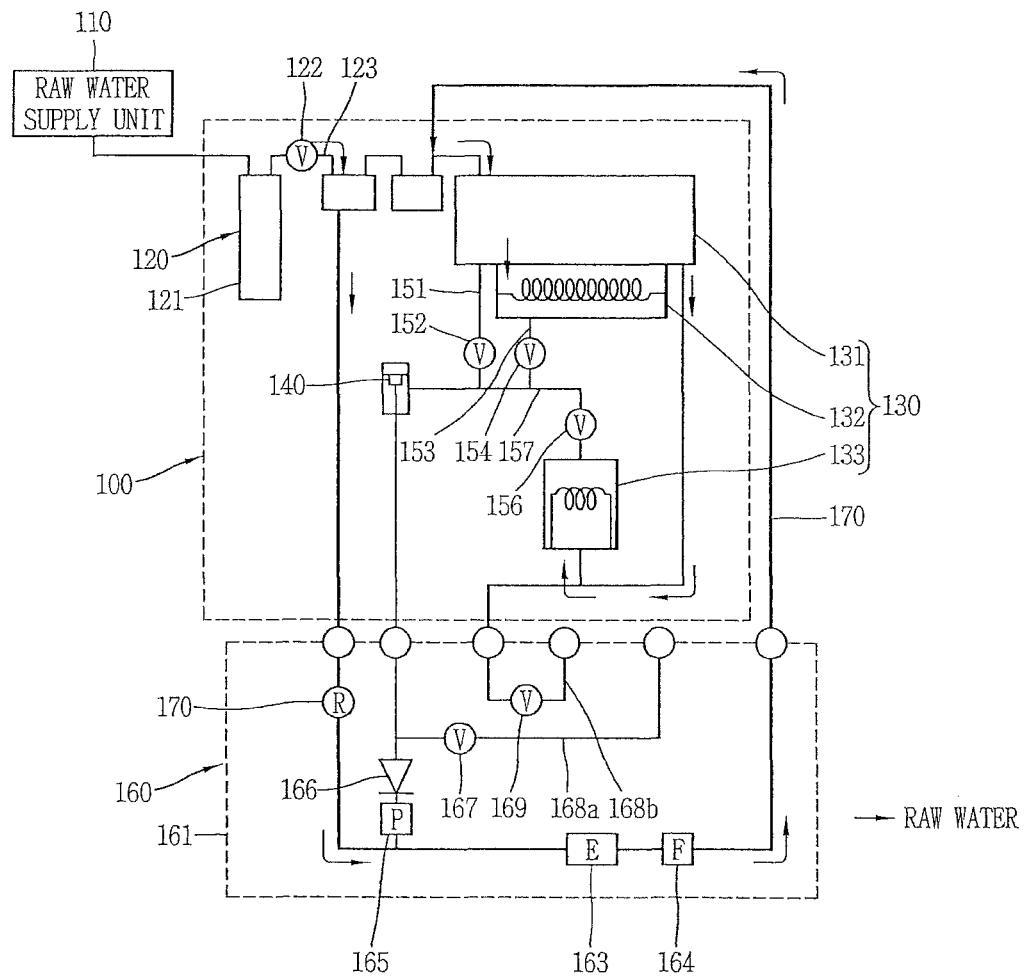

FIG. 3 is a block diagram illustrating a method of sterilizing a storage type water purifier in accordance with one exemplary embodiment of the present invention, and FIGS. 4A to 4D are conceptual views illustrating each step of the sterilizing method of FIG. 3 in detail. Specifically, FIG. 4A is a conceptual view illustrating an initial circulation step and a circulation sterilization step, FIG. 4B is a conceptual view illustrating a hot water tank sterilization and drainage step, FIG. 4C is a conceptual view illustrating a full drainage step, and FIG. 4D is a conceptual view illustrating a rinsing water supply step.

Circulation Sterilization Algorithm I

A method of sterilizing a storage type water purifier (Circulation sterilization algorithm I) includes an initial circulation step, a circulation sterilization step, a hot water sterilization and drainage step, a full drainage step, a rinsing water supply step and a full drainage step.

1) Initial Circulation Step

The initial circulation step is a step of generating sterilizing water from purified water prior to an operation of the sterilizing water generator 163 for protection and stable operation of the sterilizing water generator 163.

A stable operation of the sterilizing water generator 163, as aforementioned, is essential to generate sterilizing water through electrolysis. When water is not present in the sterilizing water generator 163 during the electrolysis, damages on electrodes and a solid polymer electrolyte (nafion) between the electrodes may be caused, whereby a lifespan of the sterilizing water generator 163 may be reduced. Also, it interferes with the smooth generation of sterilizing water and thus lowers reliability of a sterilizing operation.

To solve this, prior to the operation of the sterilizing water generator 163, an initial circulation using water stored in the water storage tank 131 is preferably carried out.

For the initial circulation, at the beginning of the circulation sterilization before operating the sterilizing water generator 163, purified water stored in the water storage tank 131 is circulated for a predetermined time, for example, about 2 seconds, and thereafter the sterilizing water generator 163 is operated.

A flow path of the purified water during initial circulation will be explained now. The purified water is discharged out of the water storage tank 131, and cooled in the second water tank 133 as a cold water tank 130. The cooled purified water is discharged from the first water tank 132, flows along the first water tank connection passage 153, a part of the second water tank connection passage 157 and the water cock 140, and then is supplied to the sterilizing water generator 163 via the circulation pump 165. Afterwards, the cooled purified water is discharged from the sterilizing water generator 163 and circulates back to the water storage tank 131.

However, the initial circulation cannot be executed upon failure of the circulation of the purified water due to a breakdown of valves and the like within the water purifier.

To supplement this, a water flow sensor 164 is installed at a rear end of the sterilizing water generator 163. The water flow sensor 164 may determine or check whether or not water is contained in the sterilizing water generator 163. The control unit may apply power to the sterilizing water generator 163 to operate it when there is water in the sterilizing water generator 163 by receiving a detection signal from the water flow sensor 164. On the other hand, when there is no water in the sterilizing water generator 163, the control unit turns off the sterilizing water generator 163 to stop the generation of the sterilizing water.

This may result in protecting the sterilizing water generator 163, and extending a lifespan of the sterilizing water generator 163, and ensuring sterilization reliability of the sterilizing water generator 163.

After filling a predetermined amount of water in the sterilizing water generator 163 through the initial circulation, the circulation sterilization is started. Whether or not to operate the sterilizing water generator 163 is controlled by the control unit according to the detection signal of the water flow sensor 164. Therefore, during a primary circulation, after the purified water is supplied once from the water storage tank 131 into the sterilizing water generator 163, when the predetermined water is filled, the generation of the sterilizing water may be started immediately. Or, during a secondary circulation, even after the purified water flows out of the water storage tank 131 and circulates back to the water storage tank 131 via the sterilizing water generator 163, if the predetermined amount of water is not filled, the generation of the sterilizing water may be started when the purified water is ensured by supplying the purified water from the water storage tank 131 into the sterilizing water generator 163. In this manner, the initial circulation allows the sterilizing water to circulate at least one time, resulting in ensuring a predetermined amount of water in the sterilizing water generator 163.

The initial circulation is preferably applied to both of the storage type water purifier 100 and the direct type water purifier 200, without a limit of type of a water purifier.

Meanwhile, for the direct type water purifier 200, air bubbles may be filled in a circulation passage 270 through which the water purifier and a sterilizer (sterilization kit) 270. The air bubbles filled in the circulation passage 270 may periodically have a bad affection on a sterilizing water generator 263, without being discharged during the circulation sterilization.

To solve this, operations of a raw water supply valve 222, a purified water valve 251b, a cold water valve 254, hot water inlet valves 255a and 256, first and second drain valves 267 and 269, a sterilizing water generator 263, and the like are controlled according to a control signal of the control unit. Accordingly, the air bubbles included in the circulation passage 270 may be removed using raw water before the operation of the sterilizing water generator 263. Here, the cold water valve is open and the other valves are closed.

In detail, before the operation of the sterilizing water generator 263, the raw water is supplied to the circulation passage 270 through the rinsing water supply passage 272. The supplied raw water flowing along the circulation passage 270 passes sequentially through the sterilizing water generator 263, the purified water passage 251, a cold water passage 253 and a water cock 240. The raw water discharged from the water cock 240 is externally discharged together with the air bubbles by pushing the air bubbles filled in the circulation passage 270 through a first drain passage 268a.

Here, a check valve 266 may prevent the raw water, which has been supplied to the circulation passage 270 through the rinsing water supply passage 272, from flowing from the circulation passage 270 back to the water cock 240.

The initial circulation and the initial drainage may selectively be carried out. The initial circulation may be applied, irrespective of the storage type water purifier 100 or the direct type water purifier 200, but the initial drainage is preferably applied only to the direct type water purifier 200.

For the storage type water purifier 100, the air bubbles filled in the circulation passage 170 may be removed when passing through the water storage tank 131 during the initial circulation. For example, the air bubbles in the circulation passage 170 which badly affect the sterilizing water generator 163 flows along the circulation passage 170 and is introduced into an upper end portion of the sterilizing water generator 163, before the operation of the sterilizing water generator 163. Then, air filled in the upper end portion of the water storage tank 131 may serve to remove the air bubbles of the circulation passage 170. This results from that the air bubbles contained in the water flowing in the circulation passage 170 is exposed and mixed with the air filled in the upper end portion of the water storage tank 131, and thus is not introduced back into the water stored in the water storage tank 131. Therefore, the storage type water purifier 100 may not cause a problem of damaging the sterilizing water generator 163 due to the air bubbles filled in the circulation passage 170 during the circulation sterilization, which is occurred in the direct type water sterilizer 200.

Also, the storage type water purifier 100 generates the sterilizing water by circulating water stored in the water storage tank 131 without throwing away water pre-stored in the water storage tank 131, thereby saving a sterilization time.

2) Circulation Sterilization Step

In the present invention, the circulation sterilization is started by supplying the sterilizing water in a state that the water storage tank 131 is filled with water up to an upper end thereof, without emptying the water filled the water storage tank 131. Accordingly, the sterilization may be undergone immediately, starting from the upper end portion of the water storage tank 131.

In the conventional direct type sterilization system, for sterilizing a storage type water purifier, purified water filled in a water storage tank is removed and then the water tank and the like are sterilized. In this instance, the sterilization is started once sterilizing water is supplied to a lower end portion of the water storage tank, and then the sterilizing water is drained out before it is filled up to the upper end portion of the water storage tank. This results in failing to sterilize the upper end portion of the water storage tank.

However, in the present invention, since the sterilization is started in a downward direction from the upper end portion of the water storage tank 131, the full water tank 130 even up to the upper end portion of the water storage tank 131 as well as the first and second water tanks 132 and 133 can be sterilized.

In the circulation sterilization step, as the raw water supply valve 122 of the filter connection passage 123, the purified water valve 152 of the water tank connection passage 151, the hot water valve 156 of the second water tank connection passage 157, the first drain valve 167 and the second drain valve 169 are closed and the cold water valve 154 of the first water tank connection passage 1544 is open by the control unit, the sterilizing water may circulate back to the water storage tank 131 along the circulation passage 170 for a predetermined time, sequentially via the water storage tank 131, the first water tank 132, the water storage tank connection passage 151, the first water tank connection passage 153, the second water tank connection passage 157, the water cock 140, the circulation pump 165 and the sterilizing water generator 163. Accordingly, the sterilizing water can completely sterilize the water tank 130, the water cock 140 and the water connection passages of the water purifier. The sterilization time and a number of circulation may not be specifically limited but comply with a recommended time and number according to a design specification (a capacity of a water tank, etc.) and sterilizing test results.

Here, the first drain valve 167 may prevent the sterilizing water from being drained out through the first drain passage 168a when the sterilizing water circulates along the circulation passage 170.

3) Sterilization and Drainage Step of the Hot Water Tank 133

In this step, sterilization and drainage of the second water tank 133 (hot water tank) are simultaneously carried out.

That is, the second water tank 133 is not sterilized by the circulation sterilization. The sterilizing water generated in the water storage tank 131 is supplied into the second water tank after the sterilization operation, thereby sterilizing the second water tank 133. Also, the provided water is drained out as soon as the sterilization.

To this end, as the raw water supply valve 122 of the filter connection passage 123, the purified water valve 152 of the water storage tank connection passage 151 and the cold water valve 154 of the first water tank connection passage 153 are closed and the hot water valve 156 of the second water tank connection passage 157 and the first drain valve 167 of the first drain passage 168a are open by the control unit, the sterilizing water stored in the water storage tank 131 flows along the second water tank introduction passage 155 so as to be introduced into a lower surface of the second tank 133. Accordingly, the sterilization of the second water tank 133 is started from the lower surface. According to a lapse of time, an amount of the sterilizing water that is filled in the second water tank 133 and mixed with hot water in the second water tank 133 increases more. As the mixed water of the hot water and the sterilizing water increases, the sterilization is carried out up to the upper end of the second water tank 133.

Here, the water storage tank 131 is located at an upper portion of the water purifier 100, the first water tank 132 as the cold water tank is located below the water storage tank 131 and the second water tank 133 as the hot water tank is located at a relatively lower position than the water storage tank 131 and the first water tank 132. With this structure, the sterilizing water may be introduced into the second water tank 133 according to a difference of a water head to make the hot water stored in the second water tank 133 discharged out through the water outlet located at the top of the second water tank 133.

The hot sterilizing water that is discharged through the upper end of the second water tank 133 after sterilizing the second water tank 133 flows along the second water tank connection passage 157 and reaches the water cock 140, thereby starting to sterilize the water cock 140.

The hot sterilizing water passed through the water cock 140 flows along the circulation passage 170, and then is drained out of the water purifier and the sterilization kit 160 through the fifth port of the sterilization kit 160.

Here, the configuration of simultaneously performing the sterilization and the drainage of the hot water tank for a reduction of the sterilization time has been described, but another configuration may also be implemented in which the hot water filled in the second water tank is drained out and then the sterilizing water is supplied into the second water tank to sterilize the second water tank.

Also, the water cock 140 is sterilized at least two times in the circulation sterilization step and the hot water sterilization and drainage step, which may result in maintaining the water cock 140, which is vulnerable to sanitation, in a more clean state.

The division into the sterilization of the water storage tank 131 and the cold water tank 132 and the sterilization of the hot water tank 133 by the circulation sterilization is because water vapor pressure increases and gas solubility is lowered when temperature of the purified water supplied into the sterilizing water generator 163 increases more, and thus the generation of the sterilizing water is not smoothly executed. As a result, for generating the sterilizing water, the purified water or cold water should be supplied to the sterilizing water generator 163 without supplying hot water. Also, the hot water can be drained out as soon as sterilizing the hot water tank 133, so as to prevent the hot sterilizing water from affecting the sterilizing water generator 163.

Also, if the drainage step is carried out before the circulation sterilization, more water should be filled in the water storage tank for the circulation sterilization, which takes more time to fill water in the water storage tank. This may result in increasing the full sterilization time. Therefore, the drainage step is preferably carried out after the circulation sterilization.

4) Full Drainage Step (Sterilizing Water Draining Step)

After completion of the sterilization of the water purifier, water of the water purifier should completely be drained out before supplying rinsing water.

The purified water valve 152 of the water storage tank connection passage 151, the cold water valve 154 of the first water tank connection passage 153, the hot water valve 156 of the second water tank connection passage 157, the first drain valve 167 and the second drain valve 169, except for the raw water supply valve 122 installed at the filter connection passage 123 (prevention of the supply of raw water), are all open by the control unit.

Accordingly, the sterilizing water filled in each of the first and second water tanks 132 and 133 flows to the water cock 140 along the water tank connection passage and sterilizes the water cock 140, and then drained out of the water purifier and the sterilization kit 160 through the first and second drain passages 168a and 168b.

Here, even in the full drainage step, the water cock 140 vulnerable to sanitation is sterilized plural times, as done in the hot water sterilization and drainage step, thereby obtaining an effect of sanitation.

Also, why the second drain passage 168b is open is to save the full drainage time as much as possible.

5) Rinsing Step

The present invention may allow for rinsing (or washing out) the water purifier using raw water.

For example, the raw water may be supplied through the rinsing water supply passage 172, whose one end is connected to the raw water supply unit 110, in more detail, the second filter 121 of the filers 121 of the filter assembly, and another side is connected to one side of the circulation passage 170, in more detail, the downstream side of the circulation pump 165.

The purified water valve 152 of the water storage tank connection passage 151, the cold water valve 154, the hot water valve 156, the first drain valve 167 and the second drain valve 169 are all closed and the raw water supply valve 122 of the filter connection passage 123 is only open by the control unit.

Accordingly, the raw water introduced into the second filter 121 of the filter assembly through the filter connection passage 123 flows along the rinsing water supply passage 172. Here, an mount of the raw water supplied and pressure of the raw water are adjusted by the regulator 171. Afterwards, the raw water flows through a connected portion between the rinsing water supply passage 172 and the circulation passage 170. Then, the raw water flows through the sterilizing water generator 163 along the circulation passage 170 and is introduced into the water purifier.

In more detail, the raw water is supplied into each water tank 130 until the water storage tank 131, the first water tank 132 and the second water tank 133 are fully filled with the raw water. For example, the purified water valve 152, the cold water valve 154 and the first and second drain valves 167 and 169 are closed until the raw water is fully filled in the water storage tank 131. The raw water is supplied into the water storage tank 131, the first water tank 132, the second water tank 133 and the water tank connection passages, so as to be filled therein up to a full water level. Here, the rinsing water is supplied and filled sequentially in the second water tank 133, the first water tank 132 and the water storage tank 131, starting from the second water tank 131 located at the lowest position in the gravity direction. Accordingly, the rinsing water washes out the water tank 130 and the passages so as to remove sterilizing water dregs, bacteria and the like stuck in the water tank 130 and the passages.

Here, the check valve 166 may prevent the raw water supplied to the circulation passage 170 through the rinsing water supply passage 172 from flowing back into the water cock 140.

6) Full Drainage Step (Rinsing Water Draining Step)

When the water storage tank 131, the first water tank 132 and the second water tank 133 are filled with the rinsing water up to their full water levels, only the raw water supply valve 122 of the filter connection passage 123 is closed and the other valves, namely, the purified water valve 152 of the water storage tank connection passage 151, the cold water valve 154, the hot water valve 156, the first drain valve 167 and the second drain valve 169, are all open. Accordingly, the rinsing water filled in each water tank 130 is drain out of the water purifier and the sterilization kit 160. The control unit may detect the full water level of the rinsing water by receiving a detection signal from a water level sensor installed at the water storage tank. Also, when the rinsing water supplied into each water tank is filled up to the full water level, the rinsing water may immediately be drained out, but if necessary, may be drained out after a predetermined time. The rinsing water draining step is the same/like to the full drainage step of the sterilizing water, so detailed description thereof is omitted.

The sterilizing method according to the present invention may be applicable even to the direct type water purifier 200.

Figure 5:
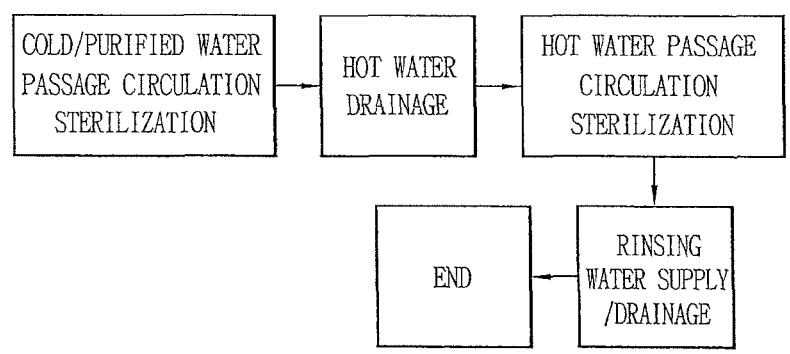
FIG. 5 is a block diagram illustrating a sterilization method applied to a direct type water purifier.

FIG. 5 is a block diagram illustrating a sterilization method applied to a direct type water purifier 200.

The method for sterilizing the direct type water purifier 200 may include an initial drainage step, a cold water/purified water passage circulation sterilization step, a hot water drainage step, a hot water tank circulation sterilization step and a rinsing water supply/drainage step.

Figure 6:
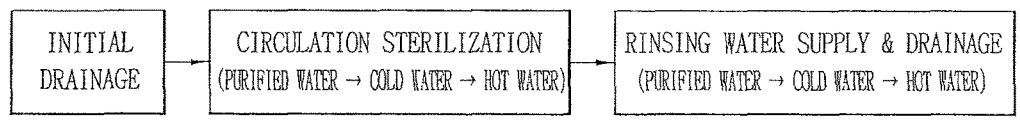
FIG. 6 is a block diagram illustrating a sterilization method of a direct type water purifier in accordance with the present invention.
Figure 7A:
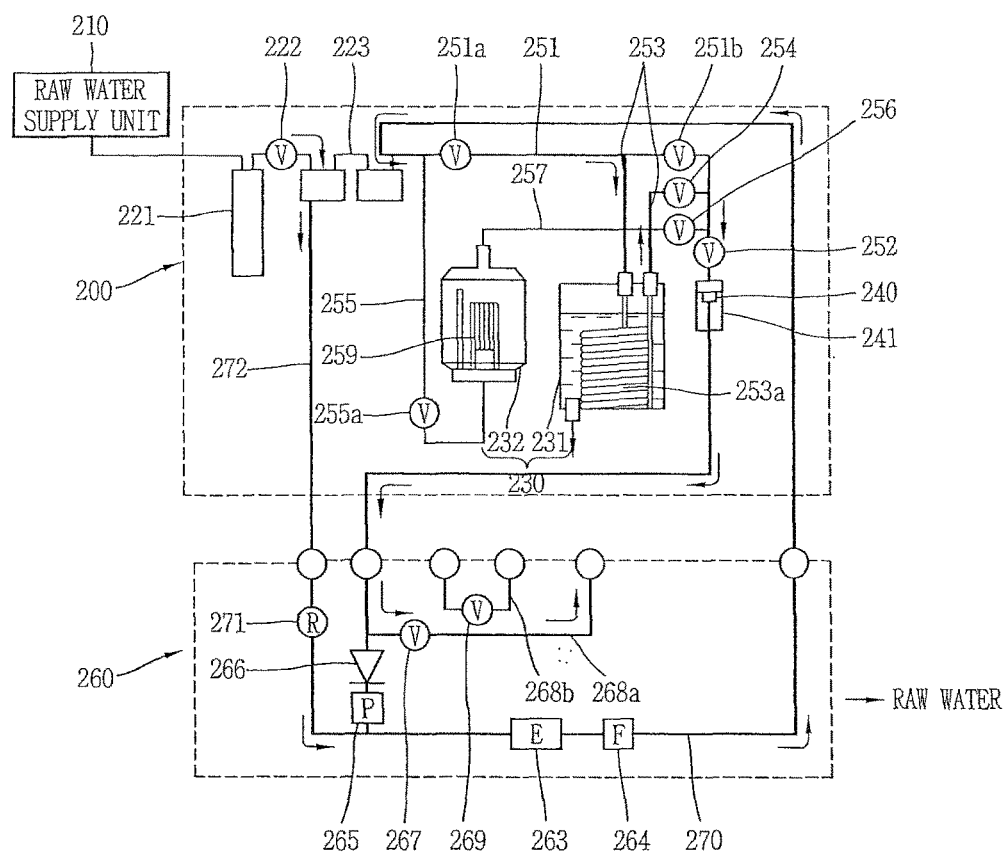
FIG. 7A is a conceptual view illustrating an initial drainage step.
Figure 7B:
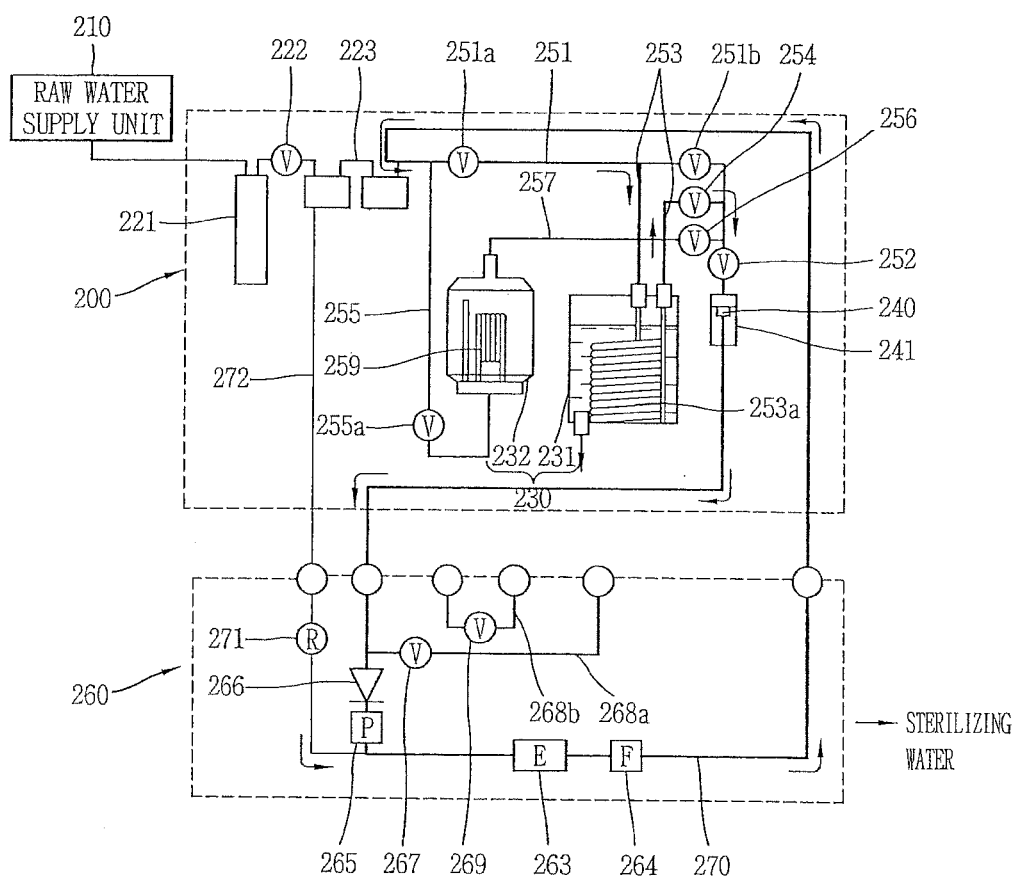
FIG. 7B is a conceptual view illustrating a circulation sterilization step.

FIG. 6 is a block diagram illustrating a sterilization method of a direct type water purifier in accordance with the present invention, FIG. 7A is a conceptual view illustrating an initial drainage step, and FIG. 7B is a conceptual view illustrating a circulation sterilization step.

1) Initial Drainage Step

Air bubbles introduced into the circulation passage 270 through which the water purifier 200 and the sterilization kit 260 are connected to each other may be likely to cause a problem upon sterilizing the direct type water purifier 200. That is, for a storage type water purifier, air bubbles in the circulation passage 270 is discharged out of an upper space of a water storage tank so as to be prevented from circulating back into the circulation passage 270. However, water is not stored in the purified water passage 251 and the cold water passage 253 of the direct type water purifier but flows along the circulation passage 270, whereby air bubbles of the circulation passage 270 cannot be discharged. Therefore, it is necessary to perform a task of discharging the air bubbles of the circulation passage 270 to outside before generating sterilizing water. That is, because the air bubbles of the circulation passage 270 damages electrodes and the like of the sterilizing water generator 263 when flowing into the sterilizing water generator 263, the initial drainage step is performed to drain out the air bubbles before the air bubbles are introduced into the sterilizing water generator 263 so as to protect the sterilizing water generator 263.

As illustrated in FIG. 7A, in the initial drainage step, a raw water supply valve 222 of the filter connection passage 223, a water inlet valve 251a of the purified water passage 251, the cold water valve 254 of the cold water passage 253, the cock valve 252 and the first drain valve 267 are open and the purified water valve 251b of the purified water passage 251, the hot water inlet valve 255a of the second water tank introduction passage 255, the hot water draw-out valve 256 of the second water tank draw-out passage 257, and the second drain valve 269 of the second drain passage 268b are closed by the control unit. Explaining a flow path of the raw water according to the operations of the valves, the raw water is introduced into one side of the circulation passage 270, in more detail, between a downstream side of the circulation pump 265 and an upstream side of the sterilizing water generator 263 through the rinsing water supply passage 272. The raw water introduced into the circulation passage 270 flows sequentially through the sterilizing water generator 263, the raw water passage 251, the first water tank introduction passage 253a, the first water tank draw-out passage 253b, and the water cock 240. During this, the raw water pushes out the air bubbles filled in the circulation passage 270, which extends from the water cock 240 to the circulation pump 165. Accordingly, the raw water is discharged along with the air bubbles through the first drain passage 268a before the air bubbles are introduced into the circulation pump 265 and the sterilizing water generator 263.

Therefore, in the initial drainage step according to the present invention, the raw water supplied through the rinsing water supply passage 272 can be used to prevent the air bubbles filled in the circulation passage 270 from being introduced into the circulation pump 165 and the sterilizing water generator 263 and to discharge the air bubbles to the outside, thereby preventing in advance damages on the circulation pump 165 and the sterilizing water generator 263 due to the introduced air bubbles.

Also, since the check valve 266 is located between the branched point of the first drain passage 268a from the circulation passage 270 and a joined point of the rinsing water supply passage 272 with the circulation passage 270, the raw water introduced into circulation passage 270 can be prevented from flowing from the circulation passage 270 back to the water cock 240 at the initial drainage step. For example, if the first drain valve 267 is opened at the initial drainage step in a structure that the check valve 266 is not located between the branched point of the first drain passage 268a and the joined point of the rinsing water supply passage 272, the raw water introduced into the joined point of the rinsing water supply passage 272 may be introduced into the water cock 240 through the circulation pump 265. In this instance, the raw water for the initial drainage may partially be discharged out of the water purifier and the sterilization kit 260 through the first drain passage 268a. This may result in lowering pressure of the raw water and failing to achieve the basic objective of the initial drainage.

2) Circulation Sterilization Step

Referring to FIG. 7B, in the circulation sterilization step, the raw water supply valve 222 of the filter connection passage 223, the purified water valve 251b of the purified water passage 251, and the hot water inlet valve 255a, the first drain valve 267 ad the second drain valve 269 installed at the second water tank introduction passage 255 and the second water tank draw-out passage 257 are closed and the water inlet valve of the purified water passage 251, the cold water valve 254 and the cock valve 252 are open by the control unit. According to the operations of the valves, the raw water purified by the filter 221 is introduced into the cold water passage 253, which is branched out from the purified water passage 251, through the purified water passage 251. Also, the purified water is cooled in the cold water passage 253. The cooled purified water is transferred to the water cock 240. The transferred purified water flows away from the water cock 240 along the circulation passage 270 and then is supplied into the sterilizing water generator 263 via the circulation pump 265.

Afterwards, the sterilizing water generator 263 generates the sterilizing water using the purified water or cold water. The generated sterilizing water flows along the circulation passage 270, and is introduced into the purified water passage 251 or the cold water passage 253, thereby sterilizing the purified water passage 251 or the cold water passage 253. Also, the sterilizing water passed through the purified water passage 251 or the cold water passage 253 may be supplied into the water cock 240 so as to sterilize the water cock 240.

Continuously, the sterilizing water passed through the water cock 240 is transferred to the sterilizing water generator 263 by receiving a driving force from the circulation pump 265 to be electrolyzed again in the sterilizing water generator 263. The re-electrolyzed sterilizing water repetitively circulates the purified water passage 251 or the cold water passage 253, which may result in the sterilization of the purified water passage 252, the cold water passage 253 and the water cock 240. FIG. 7B illustrates a circulation path of the sterilizing water for sterilizing the cold water passage 253. The sterilization of the purified water passage 251 and the cold water passage 253 may selectively be carried out, irrespective of the order.

3) Hot Water Drainage Step

During the sterilization of the hot water tank of the direct type water purifier, the sterilization and the drainage are not simultaneously carried out. The sterilization of the hot water tank is rather carried out by circulating the sterilizing water along the circulation passage 270. That is, the hot water tank is subject to the circulation sterilization. If the circulation sterilization for the hot water tank is performed without externally discharging hot water stored in the second water tank 232, the hot water may be introduced into the circulation pump 265 and the sterilizing water generator 263 along the circulation passage 270 so as to badly affect them. Therefore, the hot water is drained out before the sterilization of the hot water tank.

In the hot water drainage step, the water outlet of the second water tank 232 is located at an upper end of the water tank, and thereby the hot water may be discharged out of the second water tank 232 by pressure of raw water.

For example, the raw water supply valve 222, the hot water inlet valve 255a, the hot water outlet valve 256, the cock valve 252 and the first drain valve 267 are open and the other valves are closed according to a control signal of the control unit. Explaining a flow path of the hot water according to the operations of the valves, the raw water is introduced into the second water tank 232 through the second water tank introduction passage 255 via the filter unit 220. During the introduction of the raw water, the hot water is discharged out of the second water tank 232 by the pressure of the raw water and flows to the second water tank draw-out passage 257, thereby being charged from the water cock 240. The discharged hot water flows along the circulation passage 270, and then discharged through the first drain passage 268a prior to being introduced into the circulation pump 265 and the sterilizing water generator 263.

4) Hot Water Tank Sterilization Step

After the hot water is drained out, the purified water is supplied into the sterilizing water generator 263. The sterilizing water generated in the sterilizing water generator 263 flows along the circulation passage 270 to be introduced into the lower surface of the second water tank 232 through the purified water passage 251 and the second water tank introduction passage 255. The sterilizing water is filled in the second water tank 232, starting from the lower surface, such that the sterilization of the second water tank 232 is started from the lower surface. When the sterilizing water of the second water tank 232 reaches the full water level, the sterilizing water is immediately transferred to the water cock 240 through the second water tank draw-out passage 257. The sterilizing water discharged from the water cock 240 circulates along the circulation passage 270 for a predetermined time. During the circulation, the sterilizing water sterilizes the second water tank 232, the second water tank introduction passage 255, the second water tank draw-out passage 257 and the water cock 240.

During the hot water tank sterilization, the sterilizing water may sterilize the second water tank 232 at least one time in the circulating manner. For example, the generated sterilizing water may be drained out immediately after the sterilization of the second water tank 232 or repetitively sterilize the second water tank 232 for a predetermined time in the circulating manner. However, since the hot water tank circulation sterilization is performed in a turn-off state of the heater 259 of the second water tank 232, the sterilizing water generated using the purified water circulates. Therefore, damage on the electrodes of the sterilizing water generator 263 due to the hot water may be prevented.

Here, there may be two ways of supplying purified water for generation of the sterilizing water into the sterilizing water generator 263. One of the two ways is a method in which the purified water filtered by a filter is introduced into the circulation passage 270 through the rinsing water supply passage 272 and supplied into the sterilizing water generator 263, and the other is a method of supplying the purified water filtered by the filter into the sterilizing water generator 263 sequentially via the second water tank introduction passage 255, the second water tank 232 and the second water tank draw-out passage 257. This exemplary embodiment illustrates the former method, namely, the method of supplying the purified water to the sterilizing water generator 263 through the rinsing water supply passage 272, in order to reduce a sterilization time.

5) Rinsing and Draining Step

After completion of the hot water tank sterilization, a rinsing process may be carried out in the sequence of the purified water passage 251, the cold water passage 253 and the hot water tank. The raw water or purified water supplied through the rinsing water passage is introduced into the circulation passage 270. The rinsing water introduced in the circulation passage 270 is supplied to the purified water passage 251 via the sterilizing water generator 263, and flows along the purified water passage 251 so as to wash out the purified water passage 251. The rinsing water discharged out of the purified water passage 251 through the water cock 240 flows along the circulation passage 270 and then is drained out through the first drain passage 268a. The rinsing process of the cold water passage 253 and the hot water tank are also the same/like to that of the purified water passage 251, so redundant description thereof will be omitted.

Hereinafter, description will be given of characteristics of a sterilization system according to the present invention.

The simultaneous implementation of the circulation sterilization and the rinsing function may result in improvement of sterilization performance with respect to the same concentration of sterilization water and a sterilization time.

Also, the supply of the raw water for rinsing may be enabled without a connection of a separate hose after sterilization, resulting in simplifying the rinsing process after the circulation sterilization.

Also, the water cock 140 vulnerable to sanitation can be sterilized in the double manner by the high temperature sterilization executed upon the drainage of the hot water after the sterilization of the hot water tank as well as the circulation sterilization by the sterilizing water, thereby increasing sterilization efficiency for the water cock 140.

The present invention may further include an auxiliary drain passage (the second drain passage 168b) discharging the hot water directly out of the hot water tank, thereby reducing the drainage time of the sterilizing water and the like.

Also, the raw water can be prevented from flowing back to the water cock 140 from the circulation passage 270 during the rinsing operation using the raw water.

The purified water may be supplied into the sterilizing water generator 163 (electrolyzer) prior to the generation of the sterilizing water (initial circulation), resulting in preventing damage on the electrolyzer due to the lack of water in the electrolyzer.

Air bubbles introduced into the circulation passage 270 can be discharged out (initial drainage) by supplying the raw water into the circulation passage 270 prior to the generation of the sterilizing water.

Since the hot water is drained out before the hot water is introduced into the sterilizing water generator 163, the problem of causing difficulty in generating the sterilizing water of the sterilizing water generator 163 due to the introduction of the raw water into the sterilizing water generator 163 can be solved.

Circulation Sterilization Algorithm II

Figure 8:
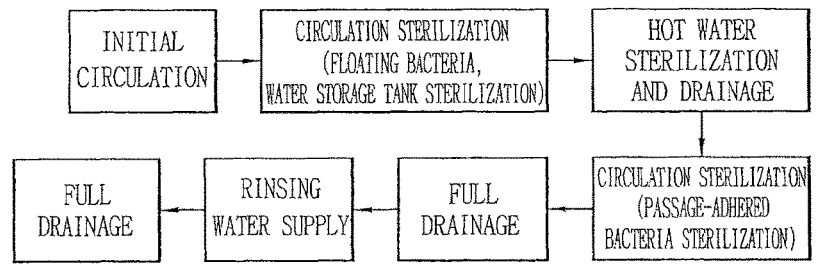
FIG. 8 is a block diagram illustrating a sterilization method in accordance with another exemplary embodiment of the present invention.
Figure 9A:
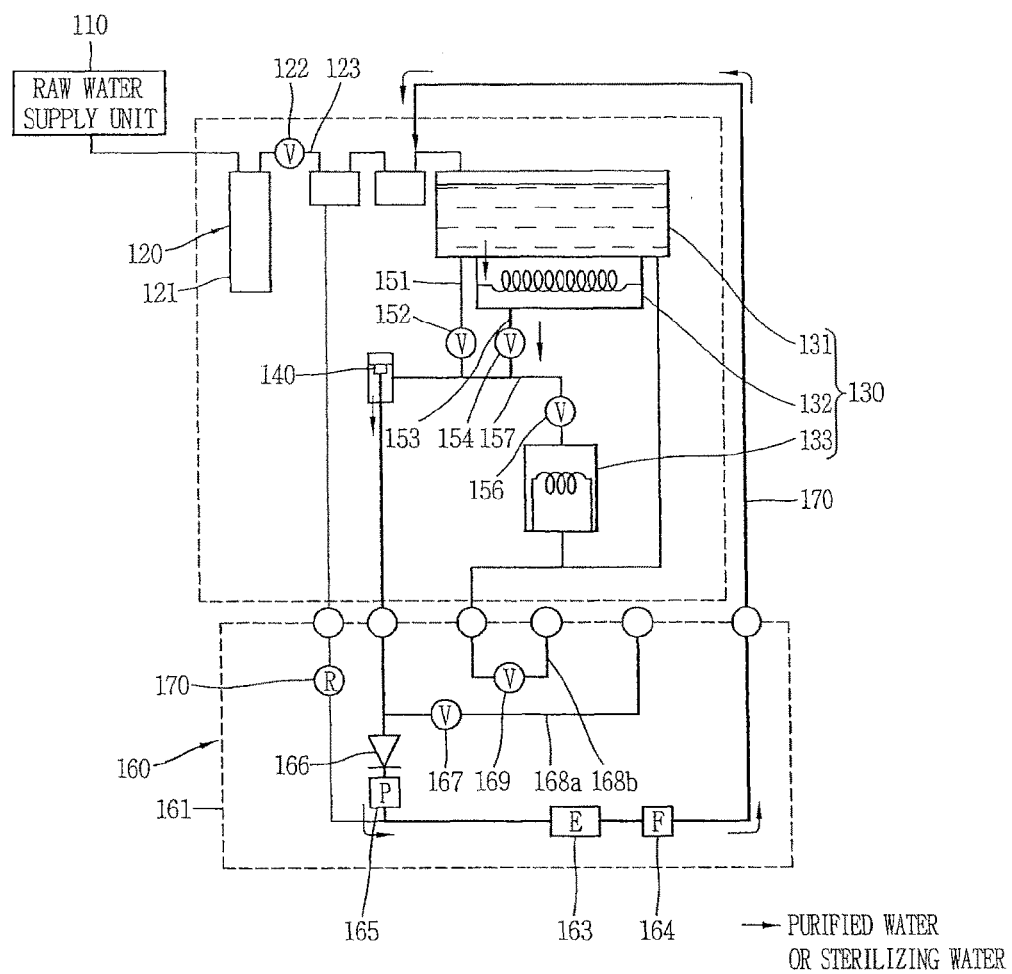
FIGS. 9A to 9E are conceptual views illustrating in detail each step of a circulation sterilization process of FIG. 8.
Figure 9B:
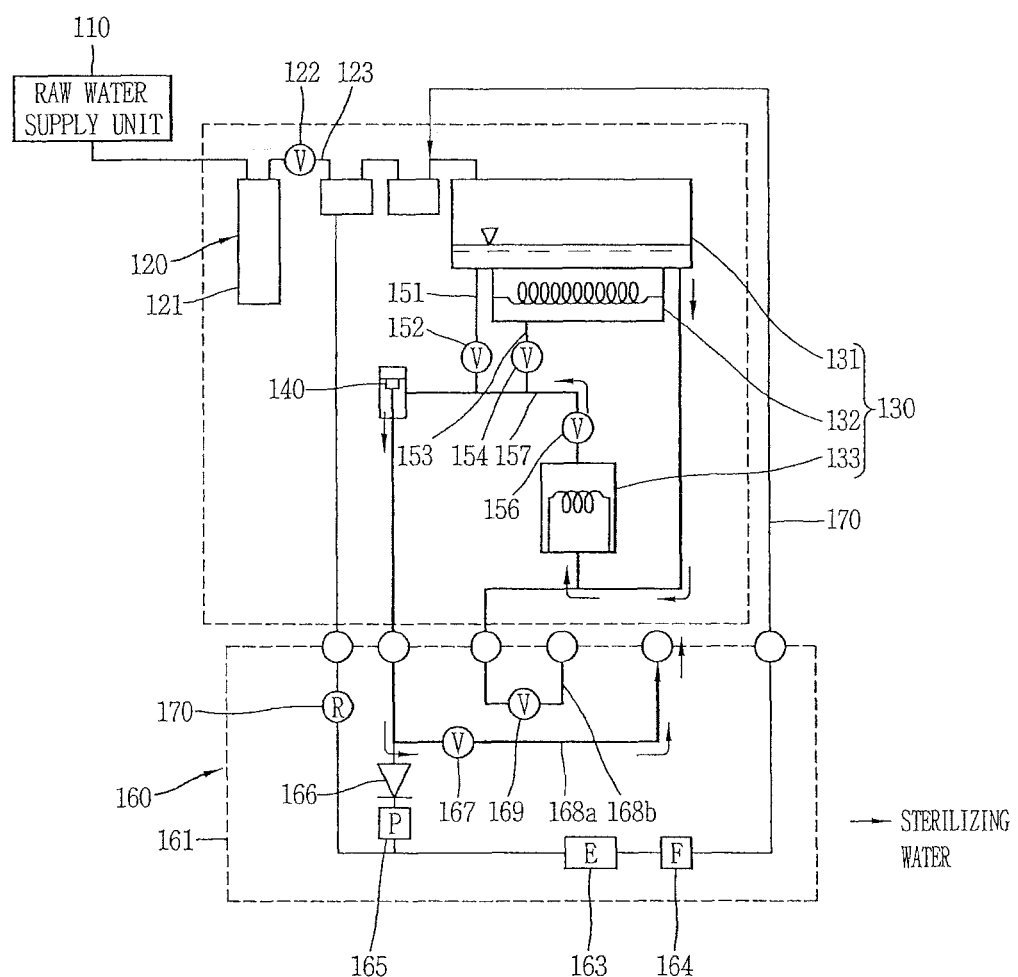
Figure 9C:
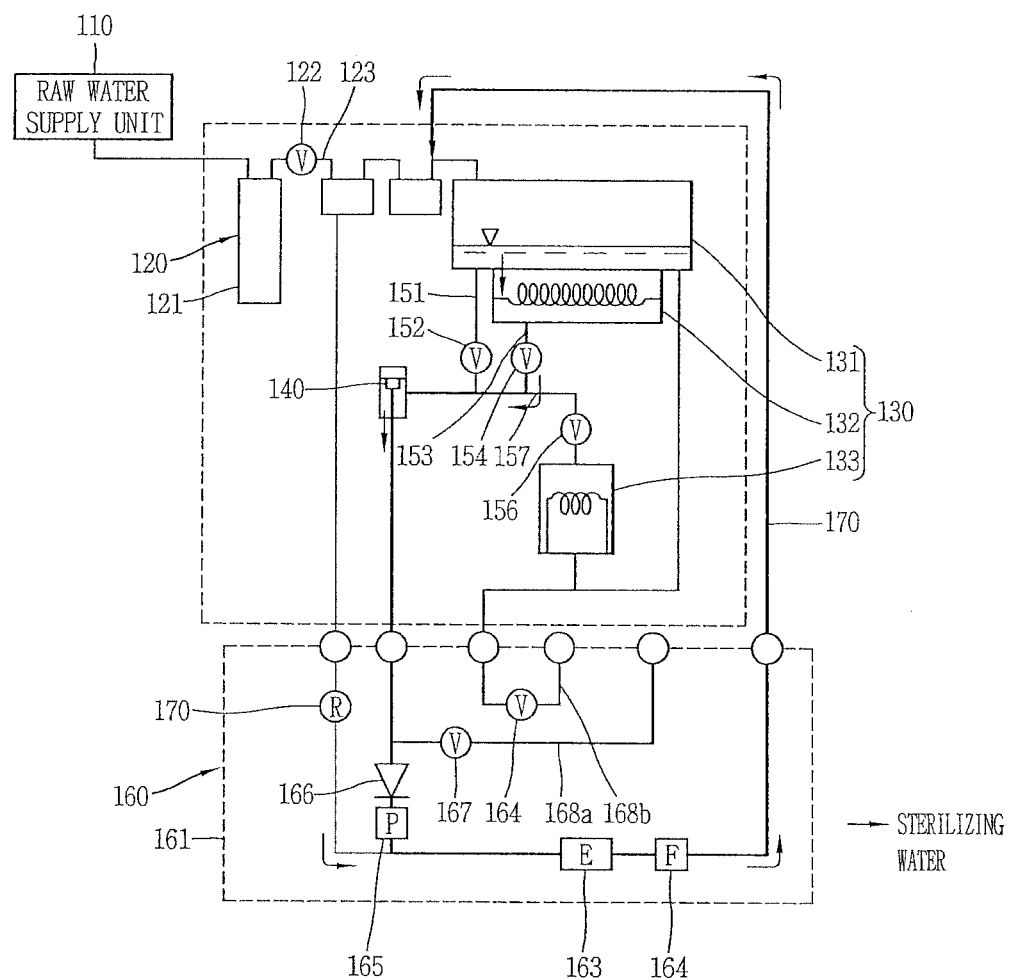
Figure 9D:
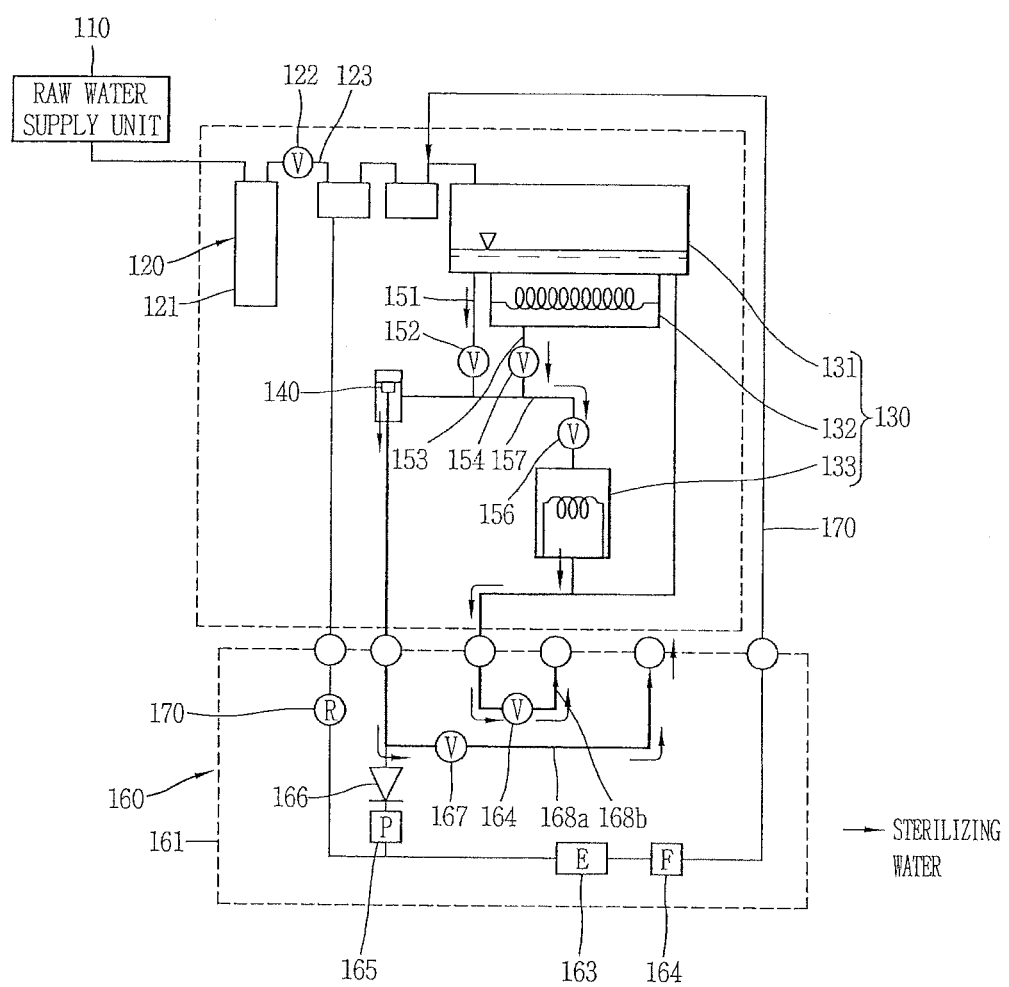
Figure 9E:
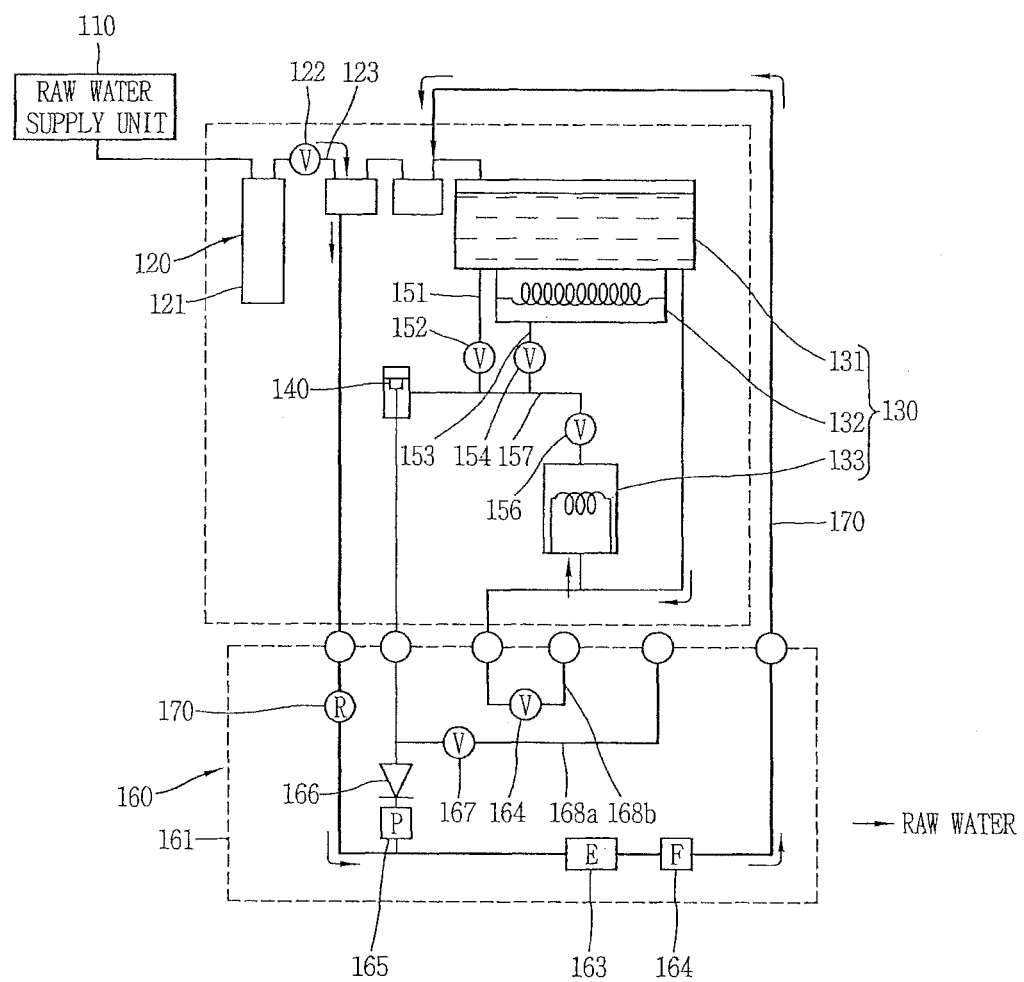

FIG. 8 is a block diagram illustrating a sterilization method in accordance with another exemplary embodiment of the present invention, and FIGS. 9A to 9E are conceptual views illustrating in detail each step of the circulation and sterilization method of FIG. 8.

In a storage type water purifier 100, a circulation sterilization may be carried out for a predetermined time, for example, for about 5 to 15 minutes when water is fully filled. A high concentration of sterilizing water may be advantageous to improve sterilization efficiency.

An adjustment of the concentration of the sterilizing water during the circulation sterilization may be enabled by controlling two factors according to the following Equations. As shown in the following Equations 1 and 2, one factor is an input current applied to electrodes of an electrolyzer, and the other factor is a flow rate of water or a volume of water.

$$P = \frac{\sum_{k=0}^{n} a_k \cdot (\text{Input Current})^k}{\text{Flow rate}} \quad \text{Equation 1}$$

$$S = \int \left(\frac{P}{V} \cdot t\right) dt = \frac{Pt^2}{2V} \quad \text{Equation 2}$$

In Equation 1, P denotes an electrolyzer concentration (a concentration of sterilizing water), Input current denotes a current input into the electrolyzer, and the flow rate denotes a rate that the sterilizing water flows. In Equation 2, S denotes sterilization power, V denotes a volume of water containing a sterilizing material, and t denotes an operation time of the electrolyzer.

According to Equation 1, the concentration of the sterilizing water is proportional to a size (magnitude) of the input current of the electrolyzer, and inversely proportional to a value of the flow rate. That is, in order to increase the concentration of the sterilizing water, the input current may increase or the flow rate may decrease.

According to Equation 2, the sterilization power is proportional to the operation time of the electrolyzer and inversely proportional to the volume of water. That is, in order to increase the sterilization power, the operation time of the electrolyzer should increase or the volume of water should decrease.

In order to generate a high concentration of sterilizing water, a high current may be applied to the sterilizing water generator 163, such as the electrolyzer, or the operation time of the electrolyzer may increase.

However, when the high current is applied or the operation time increases, it may cause a shortened lifespan of the electrolyzer (the sterilizing water generator 163). Also, exhaust ozone (ozone gas which is harmful to human body and which is discharged out of water without being dissolved in water) that is generated due to overcurrent applied to the electrolyzer may cause a problem.

Here, the present invention may increase the concentration of the sterilizing water without increasing the current applied to the sterilizing water generator 163 or the operation time of the sterilizing water generator 163, in a manner of operating the sterilization system according to a circulation sterilization algorithm II. In addition, the present invention can extend the lifespan of the electrodes of the sterilizing water generator 163 by reducing the applied current of the sterilizing water generator 163 and shortening the operation time of the sterilizing water generator 163.

Description will be given of an operation principle of a circulation sterilization algorithm II, hereinafter. A circulation sterilization is divided into a primary sterilization and a secondary sterilization. That is, floating bacteria which can be sterilized by a low concentration of sterilizing water are primarily sterilized and adhered bacteria which can be sterilized by a high concentration of sterilizing water are then secondarily sterilized.

The floating bacteria literally refer to bacteria that float in water and the adhered bacteria refer to bacteria that are stuck on a specific object. Consequently, the floating bacteria and the adhered bacteria are different from each other according to whether they are floating in water or stuck on a specific object, but substantially the same as each other in view of microorganisms. However, the concentrations of sterilizing water for sterilizing the floating bacteria and the adhered bacteria are different from each other. When sterilizing water is mixed with water containing the floating bacteria, the sterilizing water is dispersed in the water and sterilizes the floating bacteria accordingly. However, it is difficult for the sterilizing water to permeate into the adhered bacteria because the adhered bacteria are stuck on the specific object. Hence, the adhered bacteria have to be sterilized by sterilizing water of higher concentration, as compared with the floating bacteria.

In the sterilization system according to the present invention, the floating bacteria are generally present within the water tank 130 and the adhered bacteria are generally present on passages or the water cock 140. This is because the bacteria are difficult to be stuck on the water tank 130 but easily stuck on the passages and the water cock 140. Also, the passages and the water cock 140 have relatively narrower surface areas than the water tank 130, which makes the bacteria easily stuck on them. Therefore, it may be understood that the water tank 130 is typically sterilized during the primary sterilization and the passages and the water cock 140 are sterilized during the secondary sterilization. Of course, that the water tank 130 is generally sterilized during the primary sterilization does not mean that the other parts are not sterilized at all. For example, during the primary sterilization, the passages or the water cock 140 may be sterilized and also the floating bacteria of the passages and the water cock 140 may also be removed. And, during the secondary sterilization, the water tank 130 as well as the passages and water cock 140 may be sterilized.

According to the circulation sterilization algorithm II, desired sterilization power (sterilization efficiency) can be obtained by reducing an amount of water filled in the water storage tank 131 and thereby increasing the concentration of the sterilizing water circulating along the circulation passage, without increasing an input current applied to the electrodes of the electrolyzer. For example, once the sterilizing water generated in the sterilizing water generator 163 is introduced into the upper end of the water storage tank 131, the sterilization is started. Therefore, the concentration of the sterilizing water may be decided according to a volume (water level) of water filled in the water storage tank 130. The concentration of the sterilizing water increases more when the water level of the water tank 130 is lower. Therefore, the floating bacteria sterilized at the low concentration of sterilizing water or generally the water tank 130 are sterilized through the primary sterilization, and the adhered bacteria sterilized at the high concentration of sterilizing water or generally the passages and the water cock 140 are sterilized through the secondary sterilization. Also, the primary sterilization may be carried out in a state that the amount of water in the water tank 130 is at the full water level, and the secondary sterilization may be carried out in a state that the water level of the water tank 130 is lowered due to a predetermined amount of water contained in the water tank 130 being discharged out of the water supply apparatus.

The circulation sterilization algorithm II may be applied only to the storage type water purifier. That is, because the amount of water filled in the water storage tank 131 is adjusted to adjust the concentration of the sterilizing water, the algorithm II may be applied only to the storage type water purifier that stores water in the water storage tank 131 and the like.

In the sterilizing method according to the circulation sterilization algorithm II, the same input current is applied to the electrodes of the sterilizing water generator 163 during the primary and secondary sterilizations. Here, the primary circulation sterilization step is started in a state of filling water fully in the water storage tank 131, and the secondary circulation sterilization is started in a state that a predetermined amount of water has been discharged out of the water storage tank 131.

For example, in a state that the sterilizing water is filled in the water storage tank 131 up to the full water level (a volume $V_0$ of the water at the full water level), the sterilizing water circulates so as to sterilize the water storage tank 131, the first water tank 132 and the second water tank 133 which can be sterilized by the low concentration of sterilizing water. Then, some of the purified water stored in the water storage tank 131, for example, an amount of water corresponding to about $2V_0/3$ of the entire volume is discharged out of the water storage tank 131. Afterwards, the remaining amount of water ($V_0/3$) circulates to sterilize the passages and the water cock 140 which can be sterilized by the high concentration of sterilizing water.

The circulation sterilization algorithm II according to the present invention is similar to the circulation sterilization algorithm I in that the circulation sterilization and the rinsing function using the raw water are simultaneously realized, but can be said as a more improved algorithm in that the concentration of sterilizing water can increase by reducing the volume of water filled in the water storage tank 131, with respect to the same sterilization efficiency, so as to reduce the input current applied to the electrolyzes.

The circulation sterilization algorithm II illustrated in FIGS. 8 and 9A to 9E may be executed in the order of an initial circulation step, a primary circulation sterilization step, a sterilization and drainage step of the hot water tank 133, a secondary circulation sterilization step, a full drainage step, a rinsing water supply step and a full drainage step.

The primary circulation sterilization step of the circulation sterilization algorithm II is performed in a manner of generating sterilizing water using purified water stored in the water storage tank 131 in a state of a full water level of the water storage tank 131, and circulating the generated sterilizing water along the circulation passage.

Accordingly, the floating bacteria which can be sterilized by the low concentration of sterilizing water, for example, the water storage tank 131 and the first water tank 132 may generally be sterilized.

The sterilization and drainage step of the hot water tank 133 is performed after the primary circulation sterilization and before the secondary circulation sterilization. In the sterilization and drainage step of the hot water tank 133, the hot water tank 133 may be sterilized after draining out hot water filled in the hot water tank 133, or the hot water tank 133 may be sterilized using the sterilizing water discharged from the water storage tank 131 and simultaneously the hot water may be drained out. However, to save a sterilization time, the sterilization and the drainage of the hot water tank 133 may preferably be executed at the same time.

For example, some ($2V_0/3$) of water filled in the water storage tank 131 is transferred to the second water tank 132 along the second water tank introduction passage 155 according to a difference of a water head of the water storage tank 131. The hot water filled in the second water tank 132 may be discharged from the second water tank 132 due to the sterilizing water introduced into the second water tank 132, thereby being discharged through the first drain passage 168a.

For applying the circulation sterilization algorithm II to a water purifier with the hot water tank 133, the step of draining a predetermined amount of water out of the water storage tank 131 during the secondary sterilization may be included in the sterilization and drainage step of the hot water tank 133.

In the secondary circulation sterilization step, in a state that the water level of the water storage tank 130 is lowered to a predetermined water level, the reduced sterilizing water of the water storage tank 131 circulates along the circulation passage.

Accordingly, as the water level of the water storage tank 131 is reduced down to $1/3$, the concentration of the sterilizing water increases by three times, as compared with the primary circulation sterilization. This may allow for sterilizing the floating bacteria which can be sterilized at a relatively high concentration.

The circulation sterilization algorithm II is the same/like to the circulation sterilization algorithm I in view of configuration, so redundant description, such as the initial circulation, the rinsing and the drainage, will be omitted.

Hereinafter, description will be given of comparison results of the circulation sterilization algorithms I and II according to a current magnitude applied to the electrodes of the electrolyzer and an operation time of the electrolyzer.

For example, in the circulation sterilization algorithm I, the current applied to the electrodes of the electrolyzer during the circulation sterilization may be 1.85 A and the operation time of the electrolyzer for sterilizing a water purifier may be 5 minutes.

In the circulation sterilization algorithm II, the current applied to the electrodes of the electrolyzer during the primary circulation sterilization may be reduced from 1.85

A down to 0.7 A and the operation time of the electrolyzer for sterilizing a water purifier may be 1 minute.

During the secondary circulation sterilization, the current applied to the electrodes of the electrolyzer may be maintained at 0.7 A, similar to the primary circulation sterilization, and the operation time of the electrolyzer is 4 minutes.

Therefore, the circulation sterilization algorithm II may allow the applied current upon the primary and secondary circulation sterilizations to be down to 0.7 A, as compared with the circulation sterilization algorithm I, and takes totally 5 minutes for the electrolyzer to operate during the primary and second circulation sterilizations, which is the same as the sterilization time taken in the circulation sterilization algorithm I.

Also, the circulation sterilization algorithm II may not only exhibit the same sterilization power as the circulation sterilization algorithm I, but also extend a lifespan of the electrolyzer and solve the problem of generating exhaust ozone by way of reducing the applied current.

The configurations and methods of the mobile terminal in the aforesaid embodiments may not be limitedly applied, but such embodiments may be configured by a selective combination of all or part of the embodiments so as to implement many variations.

What is claimed is:

1. A method of sterilizing a water supply apparatus that is configured to purify water supplied from a water supply unit using filters, to cool or heat purified water, and to discharge purified water, cold water, or hot water through a water cock, the method comprising:
    generating sterilized water by supplying, through a circulation passage, purified water discharged from the water cock to a sterilizing water generator and electrolyzing purified water supplied to the sterilizing water generator;
    sterilizing water tanks, passages, and the water cock of the water supply apparatus by circulating sterilized water to the water supply apparatus along the circulation passage;
    draining hot water from a hot water tank disposed in the water supply apparatus;
    sterilizing the hot water tank by supplying sterilized water to the hot water tank;
    draining all sterilized water from the water tanks and the passages;
    rinsing the water tanks, the passages, and the water cock by supplying, to the water supply apparatus through a rinsing water passage, water from the water supply unit, the rinsing water passage extending from the water supply unit to the circulation passage; and
    draining rinsing water from the water tanks, water tank connection passages, and the water cock.

2. The method of claim 1, further comprising:
    initially circulating purified water by supplying purified water to the sterilizing water generator through the circulation passage prior to an operation of the sterilizing water generator.

3. The method of claim 2, wherein initially circulating comprises:
    detecting an amount of water introduced into the sterilizing water generator using a water flow sensor, the water flow sensor disposed at the sterilizing water generator; and
    turning on or off the sterilizing water generator according to the amount of water introduced detected using the water flow sensor.

4. The method of claim 1, wherein the water supply apparatus is a storage type water purifier, and the method comprises:
    storing, in a first water storage tank of the storage type water purifier, purified water,
    storing and heating purified water discharged from the first water storage tank to a second water tank of the storage type water purifier disposed below the first water storage tank, and
    introducing, into the second water tank according to a difference of a water head of the first water storage tank, sterilized water and discharging hot water from the second water tank.

5. The method of claim 4, wherein draining hot water from the second water tank and sterilizing the hot water tank comprises supplying the sterilized water of the first water storage tank to the hot water tank and simultaneously draining hot water out of the hot water tank.

6. The method of claim 4, further comprising generating, by the sterilizing water generator, sterilized water using purified water stored in the first water storage tank.

7. The method of claim 4, wherein the circulation passage extends from the water cock to the sterilizing water generator via a circulation pump,
    wherein a sterilizer comprises a first drain passage having one side connected to the circulation passage to be located between the water cock and the circulation pump, and another side connected to an outside of the water supply apparatus, and
    wherein discharging hot water from the second water tank comprises discharging, through a first drain passage having a first side connected to the circulation passage at a location between the water cock and the circulation pump and a second side connected to an outside of the water supply apparatus, hot water from the second water tank before being introduced into the circulation pump and the sterilizing water generator.

8. The method of claim 7, wherein the storage type water purifier comprises a second water tank introduction passage having a first side connected to the first water storage tank, and a second side connected to a lower surface of the second water tank, further comprising:
    draining, out of the water supply apparatus through the first drain passage and a second drain passage having a first side connected to the second water tank introduction passage and a second side connected to an outside of the water supply apparatus, sterilized water or rinsing water.

9. The method of claim 4, wherein the sterilizer comprises a rinsing water supply passage having one side connected to the raw water supply unit, and another side connected to the circulation passage to be located between the water cock and the sterilizing water generator, and
    wherein rinsing the water tanks, the passages, and the water cock comprises rinsing the water tanks, the passages, and the water cock using water from the water supply unit that is supplied to the water supply apparatus through the rinsing water supply passage and the circulation passage.

10. The method of claim 1, wherein draining hot water from the hot water tank disposed in the water supply apparatus comprises draining hot water from the hot water tank after a circulation sterilization.

11. A method of sterilizing a water supply apparatus that is configured to purify water supplied from a water supply unit using filters, to store purified water in a water storage tank, to cool or heat purified water discharged from the water storage tank, and to discharge purified water, cold water, or hot water through a water cock, the method comprising:
- generating sterilized water by electrolyzing purified water discharged from the water storage tank using a sterilizing water generator;
- performing a primary sterilization by circulating sterilized water to the water supply apparatus;
- draining a first portion of the sterilized water stored in the water storage tank while maintaining a second portion of the sterilized water in the water storage tank; and
- performing a secondary sterilization by circulating, to the water supply apparatus, the second portion of the sterilized water left in the water storage tank.

12. The method of claim 11, wherein performing the primary sterilization comprises starting sterilization in a state in which a water level of the water storage tank is a full water level.

13. The method of claim 11, wherein the water supply apparatus is a storage type water purifier,
- wherein the storage type water purifier comprises a first water tank to store and cool the purified water discharged from the water storage tank, and a second water tank disposed below the water storage tank to store and heat purified water discharged from the water storage tank, and
- wherein draining the first portion of the sterilized water stored in the water storage tank comprises:
  - draining hot water stored in the second water tank; and
  - transferring sterilized water stored in the water storage tank to the second water tank.

14. A method of sterilizing a water supply apparatus that is configured to purify water supplied from a water supply unit using filters, to make purified water flow through a purified water passage, to cool the purified water through a cold water passage or heat the purified water discharged from the purified water passage, and to discharge purified water, cold water, or hot water through a water cock, the method comprising:
- circulating, to the water supply apparatus along a circulation passage and prior to an operation of a sterilizing water generator, water from the water supply unit, and initially draining water from the water supply unit from the water supply apparatus;
- turning the sterilizing water generator on and supplying purified water discharged from the water supply apparatus to generate sterilized water through electrolysis; and
- sterilizing the water supply apparatus by circulating sterilized water to the water supply apparatus along the circulation passage.

15. The method of claim 14, wherein the water supply apparatus is a direct type water purifier,
- wherein the circulation passage has a first side connected to the water cock and a second side extending to the sterilizing water generator via a circulation pump, and
- wherein initially draining water from the water supply unit comprises supplying water from the water supply unit to an upstream side of the sterilizing water generator through a rinsing water supply passage that has a first side connected to the water supply unit and a second side connected to the circulation passage to be located between the circulation pump and the sterilizing water generator.

16. The method of claim 14, further comprising, after sterilizing the water supply apparatus, discharging, through a drain passage having a first side connected to the circulation passage at a location between the water cock and the circulation pump and a second side connected to an outside of the water supply apparatus, sterilized water discharged from the water supply apparatus.

17. The method of claim 15, wherein the direct type water purifier comprises a hot water tank configured to heat and store water purified using the filters, further comprising:
- after sterilizing the water supply apparatus, sterilizing the hot water tank by circulating sterilized water to the hot water tank.

18. The method of claim 17, further comprising:
- draining hot water stored in the hot water tank before sterilizing the hot water tank.

19. The method of claim 15, wherein generating sterilized water comprising generating the sterilized water by supplying water to the sterilizing water generator through the rinsing water supply passage.

* * * * *